(12) United States Patent
Kato et al.

(10) Patent No.: US 11,965,899 B2
(45) Date of Patent: Apr. 23, 2024

(54) CALIBRATION CURVE SETTING METHOD, SPECIMEN ANALYSIS METHOD, CALIBRATION CURVE SETTING PROGRAM, SPECIMEN ANALYSIS PROGRAM, AND SPECIMEN ANALYZER

(71) Applicant: SYSMEX CORPORATION, Kobe (JP)

(72) Inventors: Akihito Kato, Kobe (JP); Hiroshi Kurono, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 146 days.

(21) Appl. No.: 17/462,937

(22) Filed: Aug. 31, 2021

(65) Prior Publication Data

US 2022/0065881 A1  Mar. 3, 2022

(30) Foreign Application Priority Data

Aug. 31, 2020 (JP) .................... 2020-146069

(51) Int. Cl.
*G01N 21/82* (2006.01)
*G01N 21/27* (2006.01)
*G01N 35/00* (2006.01)

(52) U.S. Cl.
CPC ..... *G01N 35/00693* (2013.01); *G01N 21/274* (2013.01); *G01N 21/82* (2013.01);
(Continued)

(58) Field of Classification Search
CPC ....... G01N 35/00594; G01N 35/00693; G01N 2035/00673; G01N 2035/00702;
(Continued)

(56) References Cited

U.S. PATENT DOCUMENTS

2007/0014700 A1* 1/2007 Hiramatsu ....... G01N 35/00663
422/403
2008/0241937 A1* 10/2008 Wakamiya ....... G01N 35/00693
422/68.1
(Continued)

FOREIGN PATENT DOCUMENTS

CN  110337674 A  * 10/2019
JP  H08-262028 A  10/1996
(Continued)

OTHER PUBLICATIONS

European search report dated Jun. 23, 2022 in European patent application No. 21192344.6.
(Continued)

*Primary Examiner* — Jeffrey P Aiello
(74) *Attorney, Agent, or Firm* — Crowell & Moring LLP

(57) ABSTRACT

Disclosed is a calibration curve setting method for setting a calibration curve, the calibration curve setting method including: creating a first calibration curve on the basis of a measurement value obtained by measuring a standard sample for which a concentration of a predetermined component is known; creating a second calibration curve by correcting the created first calibration curve; displaying a screen configured to support an operator for restoring the second calibration curve to the first calibration curve; receiving an instruction of restoring the second calibration curve to the first calibration curve; and displaying the first calibration curve upon receiving the instruction of restoring.

13 Claims, 23 Drawing Sheets

(52) U.S. Cl.
CPC .............. *G01N 35/00594* (2013.01); *G01N 2035/00702* (2013.01); *G01N 2035/0091* (2013.01); *G01N 2201/12746* (2013.01)

(58) Field of Classification Search
CPC ..... G01N 2035/0091; G01N 2201/129; G01N 2201/122; G01N 2201/12746; G01N 21/274; G01N 21/82; G01N 21/75; A61B 2560/0223; A61B 5/1495
USPC ........ 422/68.1, 67, 82.05; 435/287.1, 287.3; 436/43, 164; 702/85, 19, 104, 23, 22, 702/179, 189, 30, 86, 127, 181, 183, 100, 702/32, 1, 188, 108
See application file for complete search history.

(56) References Cited

U.S. PATENT DOCUMENTS

2009/0292494 A1* 11/2009 Imai ................. G01N 35/00693
702/85
2012/0253693 A1* 10/2012 Inomata ........... G01N 35/00663
702/31
2015/0330878 A1* 11/2015 Shiba ............... G01N 35/00693
422/65
2018/0113142 A1*  4/2018 Nakano .................. G01D 9/005

FOREIGN PATENT DOCUMENTS

| JP | 2008-122316 A | 5/2008 |
| JP | 2008-190960 A | 8/2008 |
| JP | 2008-249576 A | 10/2008 |
| JP | 2009-133796 A | 6/2009 |
| JP | 2009-180676 A | 8/2009 |
| JP | 2010-066032 A | 3/2010 |

OTHER PUBLICATIONS

Partial European search report dated Feb. 7, 2022 in European patent application No. 21192344.6.
Japanese Office Action issued on Feb. 6, 2024 in a counterpart Japanese patent application No. 2020-146069.

* cited by examiner

FIG. 13B

CALIBRATION CURVE SETTING METHOD, SPECIMEN ANALYSIS METHOD, CALIBRATION CURVE SETTING PROGRAM, SPECIMEN ANALYSIS PROGRAM, AND SPECIMEN ANALYZER

RELATED APPLICATIONS

This application claims priority to Japanese Patent Application No. 2020-146069, filed on Aug. 31, 2020, the entire content of which is incorporated herein by reference.

BACKGROUND OF THE INVENTION

1. Field of the Invention

The present invention relates to a calibration curve setting method, a specimen analysis method, a calibration curve setting program, a specimen analysis program, and a specimen analyzer.

2. Description of the Related Art

In the field of clinical examination, specimen analyzers that analyze the concentration of a specific substance contained in a specimen such as plasma, serum, and urine are known. Such a specimen analyzer receives light transmitted through a specimen, light emitted from a specimen, or the like and converts a measurement value based on the amount of the light into a concentration of a predetermined substance contained in the specimen. For such conversion into the concentration, a calibration curve indicating the correspondence relationship between a measurement value based on a light amount and a concentration of the substance is used. A calibration curve is generated by measuring a plurality of standard samples for which concentrations of a specific substance are known and in which the concentrations are different from each other. Japanese Laid-Open Patent Publication No. H8-262028 indicates that although, in general, reagents are controlled at 2 to 8° C. in an apparatus, deterioration of reagents cannot be avoided, and thus, correction of calibration curves is necessary. In order to cope with such a situation, Japanese Laid-Open Patent Publication No. H8-262028 discloses an automatic analyzer in which a remaining time until correction of a calibration curve is displayed on a CRT screen; the remaining time is decreased in accordance with a lapse of time; and when the remaining time becomes zero, correction of the calibration curve is automatically performed.

SUMMARY OF THE INVENTION

When a reagent used in a specimen analyzer is to be replaced, if, for example, the kind and the production lot of the reagent before the replacement and those of the reagent after the replacement are the same, a calibration curve created for the reagent before the replacement can be used for the reagent after the replacement in some cases. At this time, in a case where the calibration curve has been corrected, if the calibration curve having been corrected so as to be adapted to a reagent deteriorated on the apparatus is used to perform concentration conversion, errors are caused. Therefore, the calibration curve needs to be restored to the calibration curve before being corrected. However, Japanese Laid-Open Patent Publication No. H8-262028 does not indicate restoration of a calibration curve having been corrected, to the calibration curve before being corrected.

The present invention has been made in consideration of the circumstances described above. An object of the present invention is to provide a calibration curve setting method, a specimen analysis method, a calibration curve setting program, a specimen analysis program, and a specimen analyzer that simplify operation of an operator for restoring a corrected calibration curve to the calibration curve before being corrected.

The present inventor conducted various studies, and has found that the above object can be achieved by the present invention described below. That is, a calibration curve setting method according to an aspect of the present invention includes: creating a first calibration curve on the basis of a measurement value obtained by measuring a standard sample for which a concentration of a predetermined component is known; creating a second calibration curve by correcting the created first calibration curve; displaying a screen configured to support an operator for restoring the second calibration curve to the first calibration curve; receiving an instruction of restoring the second calibration curve to the first calibration curve; and displaying the first calibration curve upon receiving the instruction of restoring.

The specimen analysis method includes displaying a screen configured to support an operator for restoring the second calibration curve to the first calibration curve. Therefore, operation of the operator for restoring the corrected calibration curve to the calibration curve before being corrected can be simplified.

A calibration curve setting program according to another aspect of the present invention causes a computer to execute creating a first calibration curve on the basis of a measurement value obtained by measuring a standard sample for which a concentration of a predetermined component is known; creating a second calibration curve by correcting the created first calibration curve; displaying a screen configured to support an operator for restoring the second calibration curve to the first calibration curve; receiving an instruction of restoring the second calibration curve to the first calibration curve; and displaying the first calibration curve upon receiving the instruction of restoring.

The calibration curve setting program causes a computer to execute displaying a screen configured to support an operator for restoring the second calibration curve to the first calibration curve. Therefore, operation of the operator for restoring the corrected calibration curve to the calibration curve before being corrected can be simplified.

A specimen analyzer according to another aspect of the present invention includes: a measurement unit configured to measure a standard sample for which a concentration of a predetermined component is known; a controller; and a display part configured to display information. The controller executes creating a first calibration curve on the basis of a measurement value obtained by measuring, by the measurement unit, the standard sample for which the concentration of the predetermined component is known; creating a second calibration curve by correcting the created first calibration curve; displaying, by means of the display part, a screen configured to support an operator for restoring the second calibration curve to the first calibration curve; receiving an instruction of restoring the second calibration curve to the first calibration curve; and displaying, by means of the display part, the first calibration curve upon receiving the instruction of restoring.

The specimen analyzer displays, by means of the display part, a screen configured to support an operator for restoring the second calibration curve to the first calibration curve.

Therefore, operation of the operator for restoring the corrected calibration curve to the calibration curve before being corrected can be simplified.

A specimen analysis method according to another aspect of the present invention includes: creating a first calibration curve by using a standard sample for a reagent having a specific production lot number; generating an analysis result by using the first calibration curve and a measurement value obtained by measuring a specimen using the reagent; creating a second calibration curve by correcting the first calibration curve so as to cope with change in characteristic over time of the reagent; providing an analysis result by using the second calibration curve and a measurement value obtained by measuring a specimen using the reagent having the change in characteristic over time; and when the reagent having the specific production lot number has been replaced by a reagent of a same kind, and a production lot number of the replacing reagent is identical to the production lot number of the reagent before being replaced, providing an analysis result by using the first calibration curve and a measurement value obtained by measuring a specimen using the replacing reagent.

The specimen analysis method provides, when the reagent having the specific production lot number has been replaced by a reagent of a same kind, and a production lot number of the replacing reagent is identical to the production lot number of the reagent before being replaced, an analysis result by using the first calibration curve and a measurement value obtained by measuring a specimen using the replacing reagent. Therefore, operation of the operator for restoring the corrected calibration curve to the calibration curve before being corrected can be simplified.

A specimen analysis program according to another aspect of the present invention causes a computer to execute creating a first calibration curve by using a standard sample for a reagent having a specific production lot number; generating an analysis result by using the first calibration curve and a measurement value obtained by measuring a specimen using the reagent; creating a second calibration curve by correcting the first calibration curve so as to cope with change in characteristic over time of the reagent; providing an analysis result by using the second calibration curve and a measurement value obtained by measuring a specimen using the reagent having the change in characteristic over time; and when the reagent having the specific production lot number has been replaced by a reagent of a same kind, and a production lot number of the replacing reagent is identical to the production lot number of the reagent before being replaced, providing an analysis result by using the first calibration curve and a measurement value obtained by measuring a specimen using the replacing reagent.

The specimen analysis program provides, when the reagent having the specific production lot number has been replaced by a reagent of a same kind, and a production lot number of the replacing reagent is identical to the production lot number of the reagent before being replaced, an analysis result by using the first calibration curve and a measurement value obtained by measuring a specimen using the replacing reagent. Therefore, operation of the operator for restoring the corrected calibration curve to the calibration curve before being corrected can be simplified.

A specimen analyzer according to another aspect of the present invention is configured to analyze a specimen using a calibration curve, and the specimen analyzer includes: a measurement unit configured to measure a specimen and a standard sample for which a concentration of a predetermined component is known; and a controller. The controller executes creating a first calibration curve by using the standard sample for a reagent having a specific production lot number; generating an analysis result by using the first calibration curve and a measurement value obtained by measuring a specimen using the reagent; creating a second calibration curve by correcting the first calibration curve so as to cope with change in characteristic over time of the reagent; providing an analysis result by using the second calibration curve and a measurement value obtained by measuring a specimen using the reagent having the change in characteristic over time; and when the reagent having the specific production lot number has been replaced by a reagent of a same kind, and a production lot number of the replacing reagent is identical to the production lot number of the reagent before being replaced, providing an analysis result by using the first calibration curve and a measurement value obtained by measuring a specimen using the replacing reagent.

The specimen analyzer provides, when the reagent having the specific production lot number has been replaced by a reagent of a same kind, and a production lot number of the replacing reagent is identical to the production lot number of the reagent before being replaced, an analysis result by using the first calibration curve and a measurement value obtained by measuring a specimen using the replacing reagent. Therefore, operation of the operator for restoring the corrected calibration curve to the calibration curve before being corrected can be simplified.

The calibration curve setting method, the specimen analysis method, the calibration curve setting program, the specimen analysis program, and the specimen analyzer according to the present invention can simplify operation of the operator for restoring the corrected calibration curve to the calibration curve before being corrected.

BRIEF DESCRIPTION OF THE DRAWINGS

FIG. 13B shows another example of the calibration curve screen;

DETAILED DESCRIPTION OF THE PREFERRED EMBODIMENTS

Figure 1:
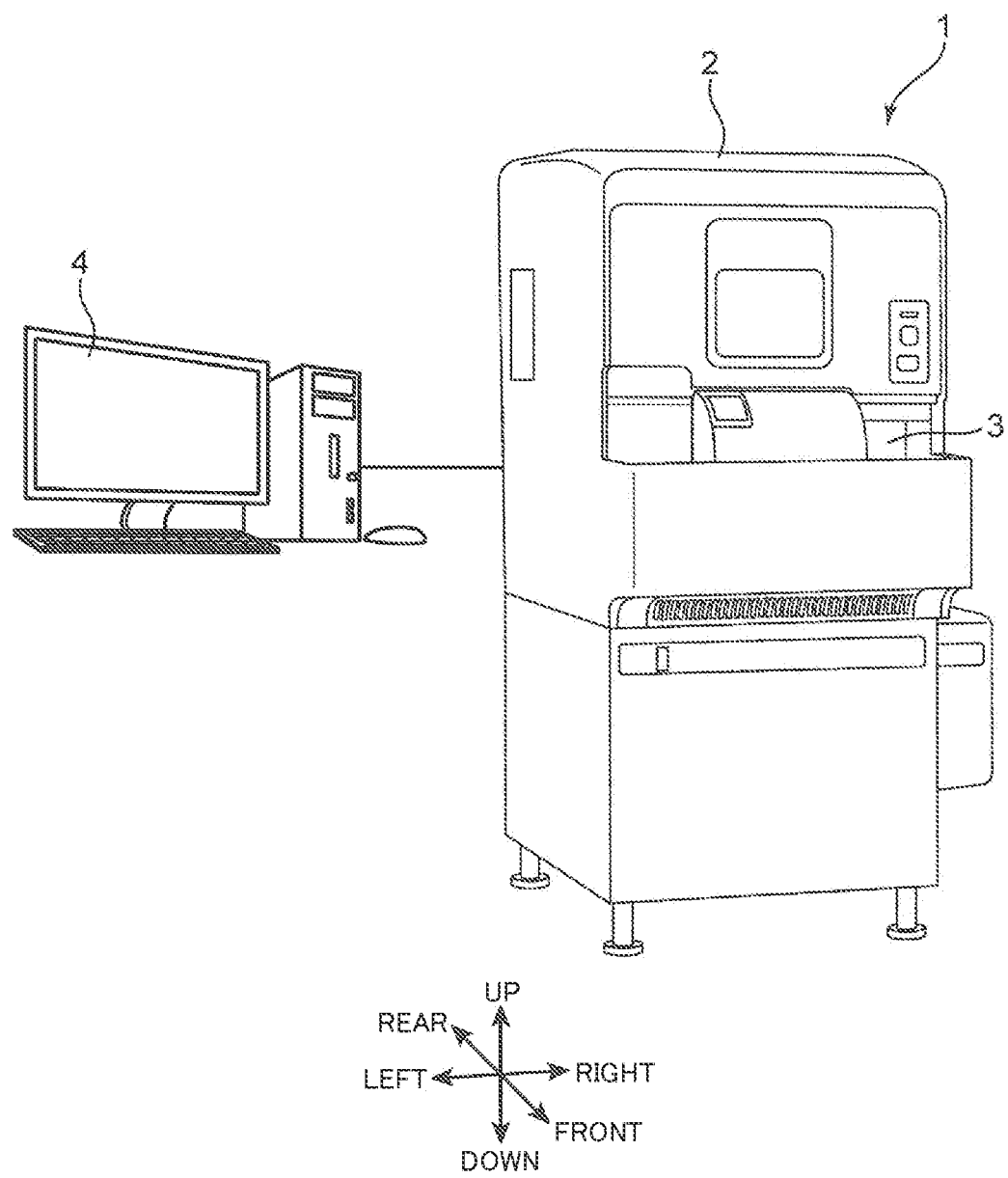
FIG. 1 is a perspective view schematically showing an external configuration of a specimen analyzer according to an embodiment of the present invention.

Hereinafter, an embodiment according to the present disclosure will be described with reference to the drawings. In the drawings, components denoted by the same reference character are the same components, and description thereof is omitted as appropriate.

FIG. 1 is a perspective view schematically showing an external configuration of a specimen analyzer 1 according to an embodiment of the present disclosure. The hardware configuration of the specimen analyzer 1 of the present embodiment is disclosed in detail in US Patent Publication No. 2018-0267069, the content of which is incorporated herein by reference. In the present specification, the apparatus configuration of the parts that are relevant to the present disclosure will be mainly described. The specimen analyzer 1 includes a measurement unit 2, a transport unit 3, and an analysis unit 4. The specimen analyzer 1 is a blood coagulation analyzer that analyzes coagulability of blood as a specimen. In the present specification, the directions of front, rear, left, right, up, and down are defined to be the directions of arrows shown in FIG. 1.

Figure 2A:
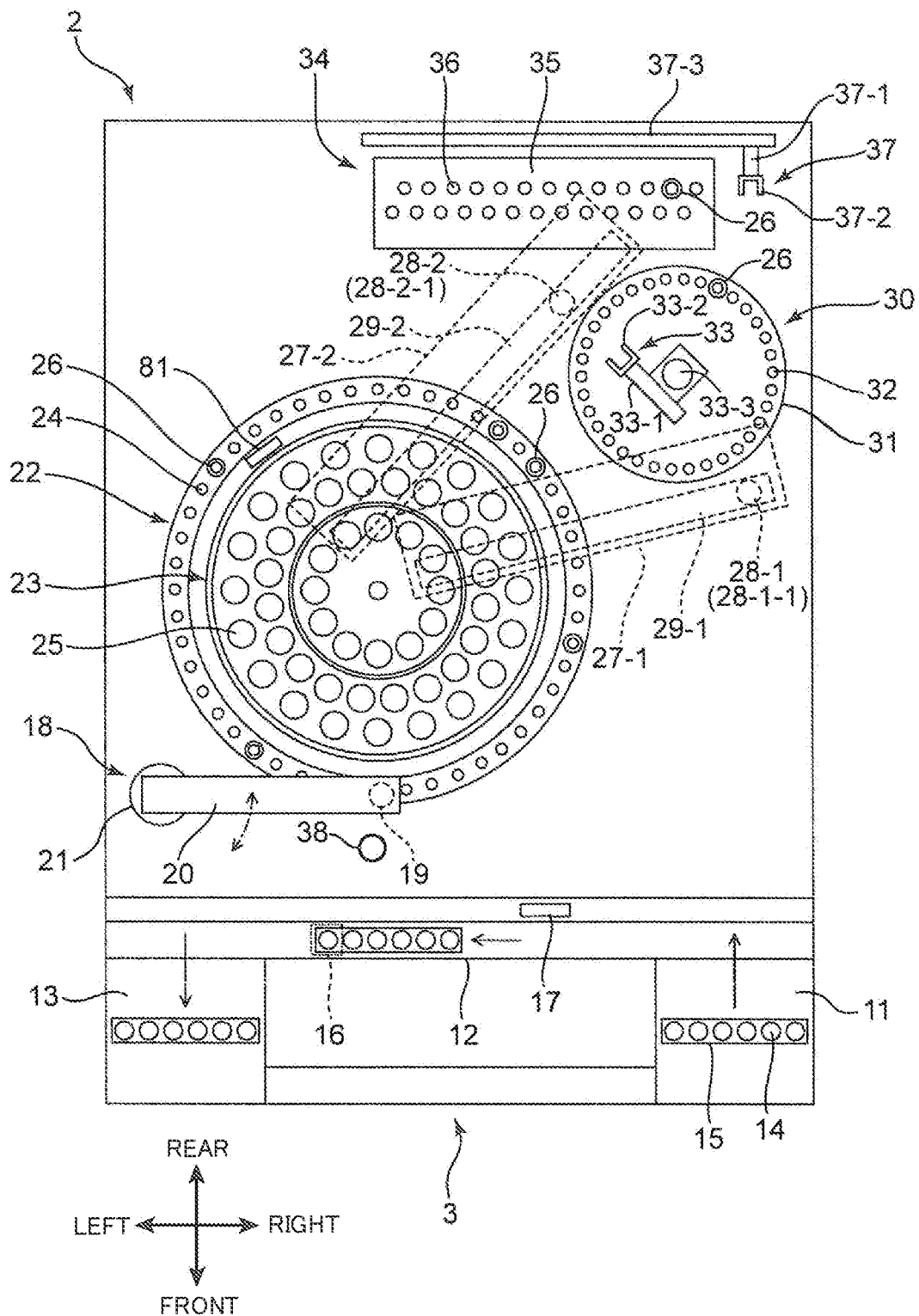
FIG. 2A is a top view schematically showing configurations of a measurement unit and a transport unit.

FIG. 2A is a top view schematically showing configurations of the measurement unit 2 and the transport unit 3. The transport unit 3 is disposed to the front of the measurement unit 2.

The transport unit 3 includes a rack setting part 11, a rack transporter 12, and a rack collection part 13. The rack setting part 11 is a region for disposing, on the specimen analyzer 1, a specimen rack 15 having set thereon one or a plurality of specimen containers 14 serving as analysis targets. A specimen rack 15 having placed thereon the specimen containers 14 each containing a specimen is set on the rack setting part 11 by an operator.

The rack transporter 12 is disposed between the rack setting part 11 and the rack collection part 13.

The rack collection part 13 is a region where a specimen rack 15 for which collection of each specimen has been completed and which has been transported by the rack transporter 12 is collected and retained. The rack collection part 13 is disposed on the downstream side of the rack transporter 12.

In the transport unit 3, the specimen rack 15 disposed in the rack setting part 11 is transported to the rack transporter 12, and each specimen container 14 is sequentially positioned at a specimen suction position 16. A specimen dispenser 18 collects, through suction, a specimen from a specimen container 14 positioned at the specimen suction position 16. In the transport unit 3, upon completion of collection of the specimens from all of the specimen containers 14 set in the specimen rack 15, the specimen rack 15 is transported to the rack collection part 13 so as to be collected and retained therein.

In the measurement unit 2, a reagent is mixed with the specimen collected at the specimen suction position 16, thereby preparing a measurement sample, and this prepared measurement sample is measured. The measurement unit 2 includes the specimen dispenser 18, a reaction chamber holding part 22, a reagent storage part 23, a reagent dispenser 27-1, a reagent dispenser 27-2, a heating part 30, a sample measurement part 34, and a specimen information reading part 17.

The reagent storage part 23 stores a reagent to be used in preparation of a measurement sample. Specifically, the reagent storage part 23 is a disk-like member, in a plan view, in which a plurality of reagent holding holes 25 each for holding a reagent container that contains a reagent are formed at predetermined intervals in the circumferential direction. In the example shown in FIG. 2A, three rows of the plurality of reagent holding holes 25 arranged in the circumferential direction are formed in the radial direction. The reagent storage part 23 is configured to be rotatable about the center thereof in the circumferential direction. The reagent stored in the reagent storage part 23 is a reagent for prothrombin time measurement, a reagent for fibrinogen measurement, or the like.

A reagent information reading part 81 is a device that reads reagent information from a reagent information member that contains reagent information. The reagent information reading part 81 is disposed at a position adjacent to the reagent storage part 23 so as to be able to read reagent information from a reagent information member added to each reagent container held in the reagent storage part 23. Specifically, the reagent information member is a sticker having printed thereon a bar code having reagent information recorded thereon, and the reagent information reading part 81 includes a bar code reader. The bar code may be a one-dimensional bar code or a two-dimensional bar code (so-called QR code (registered trademark)). The reagent information member may be an RFID tag having reagent information stored therein, and the reagent information reading part 81 may be an RFID reader. The reagent information includes information indicating the kind of the reagent and information indicating the production lot of the reagent.

The reaction chamber holding part 22 holds a reaction chamber 26 for reacting a specimen and a reagent to prepare a measurement sample. The reaction chamber holding part 22 is an annular member, in a plan view, in which a plurality of holding holes 24 each for holding a reaction chamber 26 are formed at predetermined intervals in the circumferential direction. The reaction chamber holding part 22 is configured to be rotatable about the center thereof in the circumferential direction.

The specimen dispenser 18 collects, through suction, a specimen from a specimen container 14 positioned at the specimen suction position 16, and discharges the collected specimen into a reaction chamber 26 in the reaction chamber holding part 22. Specifically, the specimen dispenser 18 includes: a specimen suction nozzle 19 which suctions a specimen from a specimen container 14; an arm 20 which is a bar-like member whose one end portion has attached thereto a specimen suction nozzle 19-1 whose suction hole is oriented downward; and a drive mechanism 21 attached to the other end portion of the arm 20. The drive mechanism 21 can drive the arm 20 in the up-down direction and in a circumferential direction about the other end portion, used as the rotation axis, of the arm 20. The specimen dispenser 18 is disposed between the specimen suction position 16 and the reaction chamber holding part 22 so as to be able to collect a specimen at the specimen suction position 16 and to discharge the collected specimen into a reaction chamber 26 in the reaction chamber holding part 22.

A diluent holding hole 38 for holding a diluent container containing a predetermined diluent is formed between the specimen suction position 16 and the reaction chamber holding part 22. The specimen dispenser 18 can suction the diluent from the diluent container held in the diluent holding hole 38 and dispense the diluent into a reaction chamber 26. Therefore, in a calibration curve creation process described later, the specimen dispenser 18 can dispense a standard sample and a diluent into reaction chambers to prepare a plurality of measurement samples that have different dilution ratios, on the basis of the standard sample.

The heating part 30 is disposed to the right rear of the reaction chamber holding part 22 so as to be adjacent thereto. The heating part 30 heats a specimen contained in a reaction chamber 26 to a predetermined temperature (e.g., 37° C.) appropriate for measurement. The heating part 30 includes a heating and holding part 31 and a transfer part 33. The heating and holding part 31 is a disk-like unit, in a plan view, in which a plurality of holding holes 32 each for holding a reaction chamber 26 are formed in the peripheral portion thereof at predetermined intervals in the circumferential direction. The heating and holding part 31 is configured to be rotatable about the center thereof. The heating and holding part 31 includes: a horizontal arm 33-1 expandable in the horizontal direction; a container catcher 33-2 provided at the leading end of the horizontal arm 33-1; and a rotation mechanism 33-3 which rotates the horizontal arm 33-1 about the proximal end thereof. The transfer part 33 causes the horizontal arm 33-1 to rotate and expand by means of the rotation mechanism 33-3, thereby causing the container catcher 33-2 to capture a reaction chamber 26 held in the reaction chamber holding part 22, and causes the horizontal arm 33-1 to contract, thereby transferring the reaction chamber 26 to the heating and holding part 31. The transfer part 33 causes the horizontal arm 33-1 to rotate and expand by means of the rotation mechanism 33-3, thereby transferring a reaction chamber 26 held by the container catcher 33-2, to a position 28-1-1 immediately below a reagent suction nozzle 28-1 of the reagent dispenser 27-1, and a position 28-2-1 immediately below a reagent suction nozzle 28-2 of the reagent dispenser 27-2.

The reagent dispenser 27-1 is provided above the reagent storage part 23, the reaction chamber holding part 22, and the heating part 30. The reagent dispenser 27-1 collects, through suction, a predetermined amount of a reagent stored in the reagent storage part 23, and discharges the collected reagent into a reaction chamber 26 transferred to the position 28-1-1 immediately below the reagent suction nozzle 28-1. Accordingly, the specimen and the reagent are mixed together, whereby a sample is prepared. The reagent dispenser 27-1 includes the reagent suction nozzle 28-1 which suctions a reagent from a reagent container held in a reagent holding hole 25; and a guide 29-1 which is a bar-like member having attached thereto the reagent suction nozzle 28-1 whose suction hole is oriented downward. The reagent suction nozzle 28-1 can be moved in the horizontal direction between one end portion and the other end portion of the guide 29-1 by a stepping motor 29A (see FIG. 3). The reagent suction nozzle 28-1 can be moved in the up-down direction by a stepping motor 29B (see FIG. 3). The one end portion of the guide 29-1 is positioned above the reagent storage part 23, and the other end portion is positioned in the vicinity of the heating part 30. In order to allow collection of a reagent from the reagent storage part 23, the reagent dispenser 27-1 is disposed such that the guide 29-1 extends across from the vicinity of the center of the disk-like reagent storage part 23 to the peripheral portion thereof. Therefore, in a plan view, the reagent dispenser 27-1 overlaps the reaction chamber holding part 22 and the reagent storage part 23. Thus, in FIG. 2A, the reagent dispenser 27-1 is indicated by a broken line. This also applies to the reagent dispenser 27-2.

Similarly, the reagent dispenser 27-2 collects, through suction, a predetermined amount of an activation reagent that is for starting coagulation reaction and that is stored in the reagent storage part 23, and discharges the collected activation reagent into a reaction chamber 26 that has been transferred by a transfer part 37 from the heating part 30 to the position 28-2-1 immediately below the reagent suction nozzle 28-2 of the reagent dispenser 27-2. Accordingly, the specimen and the activation reagent are mixed together, whereby coagulation reaction is started. The reagent dispenser 27-2 includes the reagent suction nozzle 28-2 which suctions a reagent in a reagent container held in a reagent holding hole 25, and a guide 29-2 which is a bar-like member having attached thereto the reagent suction nozzle 28-2 whose suction hole is oriented downward. The reagent suction nozzle 28-2 includes a liquid surface sensor 28A (see FIG. 3). The reagent suction nozzle 28-2 can be moved in the horizontal direction between one end portion and the other end portion of the guide 29-2 by the stepping motor 29A (see FIG. 3). The reagent suction nozzle 28-2 can be moved in the up-down direction by the stepping motor 29B (see FIG. 3). The one end portion of the guide 29-2 is positioned above the reagent storage part 23, and the other end portion is positioned in the vicinity of the heating part 30 and the sample measurement part 34. In order to allow collection of a reagent from the reagent storage part 23, the reagent dispenser 27-2 is disposed such that the guide 29-2 extends across from the vicinity of the center of the disk-like reagent storage part 23 to the peripheral portion thereof.

The sample measurement part 34 is disposed to the rear of the heating part 30 so as to be adjacent thereto. The sample measurement part 34 applies light to the sample contained in a reaction chamber 26, detects an optical signal, and outputs a digital signal corresponding to the light intensity. The sample measurement part 34 includes a sample holding plate 35, the transfer part 37, and a detector 39 (see FIG. 3). The sample holding plate 35 is a box-shaped member in which a plurality of sample holding holes 36 each for holding a reaction chamber 26 are formed at predetermined intervals. The transfer part 37 includes: a horizontal arm 37-1 expandable in the horizontal direction; a container catcher 37-2 provided at the leading end of the horizontal arm 37-1; and a slide mechanism 37-3 which causes the horizontal arm 37-1 to slide in the left-right direction. The transfer part 37 transfers a reaction chamber 26 held in a holding hole 32 of the heating and holding part 31 of the heating part 30, to a sample holding hole 36 of the sample holding plate 35 via the position 28-2-1 immediately below the reagent suction nozzle 28-2 of the reagent dispenser 27-2.

Figure 2B:
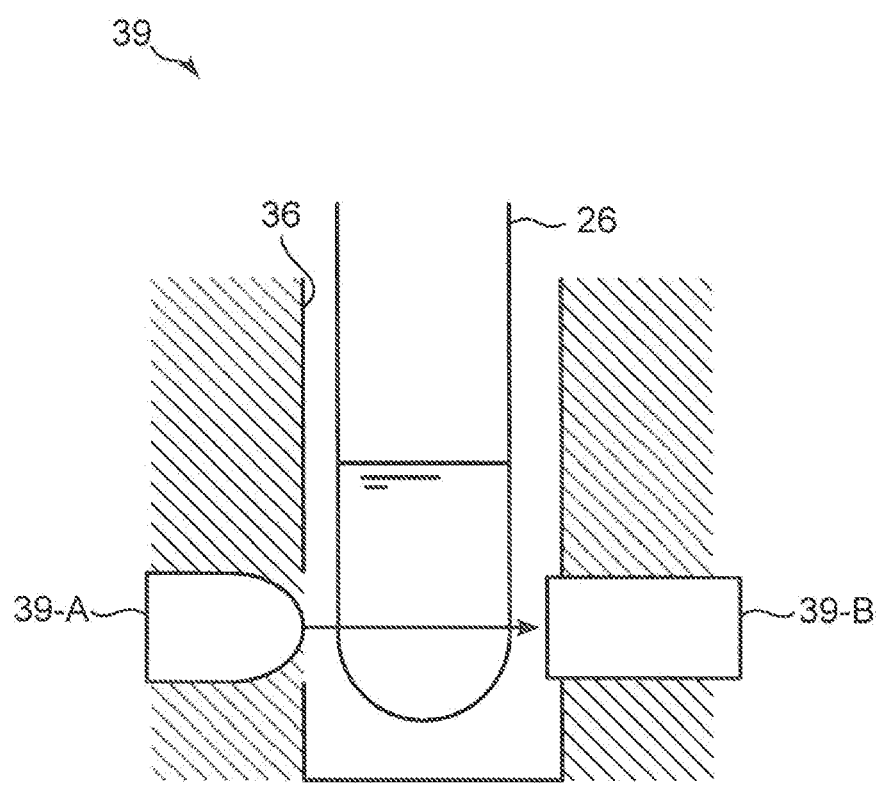
FIG. 2B schematically shows a configuration of a sample measurement part.

As shown in FIG. 2B, the detector 39 includes, in each sample holding hole 36: a light source part 39A which applies light to a sample contained in a reaction chamber 26 held in the sample holding hole 36; and a light receiving part 39B which receives light transmitted through the sample, converts an analog electric signal corresponding to the received light intensity into a digital signal, and outputs the digital signal.

With reference back to FIG. 2A, the specimen information reading part 17 is a device that reads specimen information from a specimen information member that stores specimen information. The specimen information reading part 17 is disposed at a position adjacent to the rack transporter 12 so as to be able to read specimen information from a specimen information member added to a specimen container 14 being transported by the rack transporter 12. The specimen information member is a label having printed thereon a machine readable code having specimen information recorded thereon, and the specimen information reading part 17 includes a code reader. The machine readable code is a one-dimensional bar code, and the specimen information reading part 17 is a bar code reader.

Figure 3:
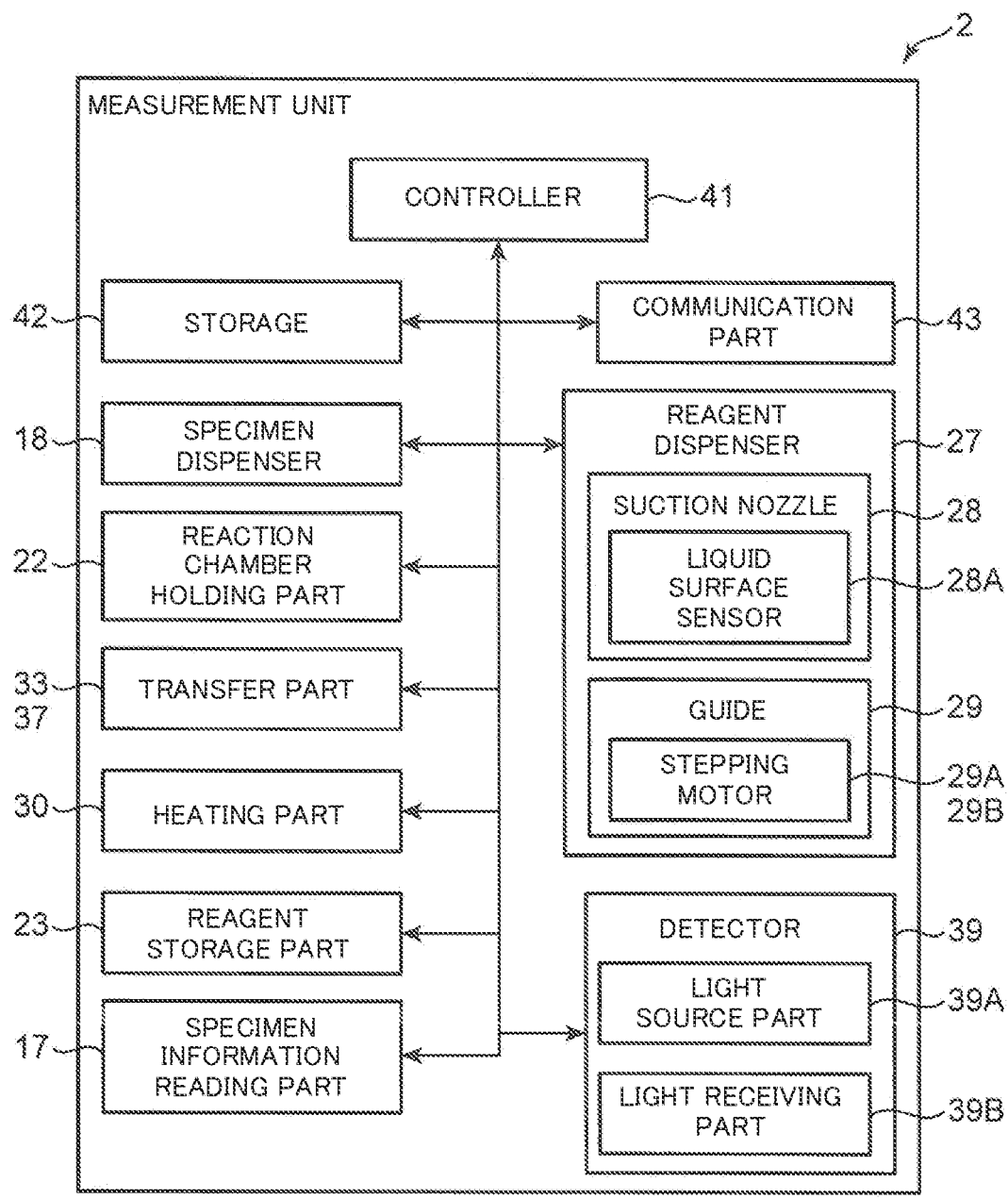
FIG. 3 is a block diagram showing a configuration of the measurement unit.

FIG. 3 is a block diagram showing a configuration of the measurement unit 2. The measurement unit 2 includes a controller 41, a storage 42, and a communication part 43, and, as shown in FIG. 2A, the specimen dispenser 18, the reaction chamber holding part 22, the transfer parts 33, 37, the heating part 30, the reagent storage part 23, the specimen information reading part 17, the reagent dispenser 27, and the detector 39.

The controller 41 is a circuit for controlling operations of the respective parts of the measurement unit 2 and the transport unit 3 in accordance with functions thereof. The controller 41 includes a CPU and peripheral circuits thereof, for example.

The storage 42 includes a hard disk that stores various types of programs, various types of data, and the like to be used when the controller 41 controls the respective parts of the measurement unit 2 and the transport unit 3.

The communication part 43 is a circuit that performs input/output of data with an external device in accordance with control by the controller 41. The communication part 43 includes an interface circuit using a communication standard such as IEEE1394 and Ethernet (registered trademark), for example.

Figure 4:
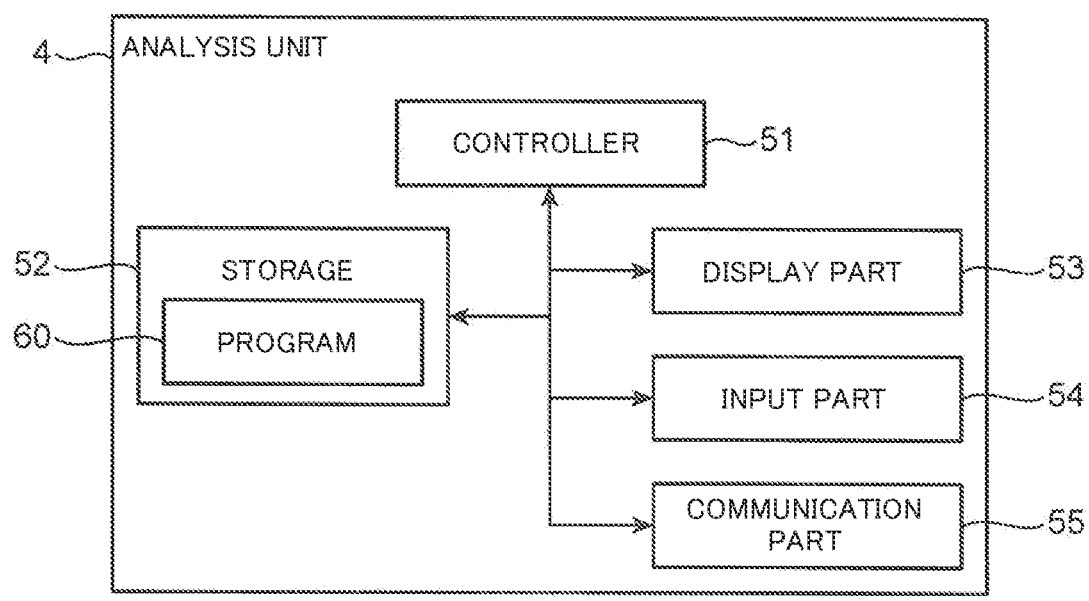
FIG. 4 is a block diagram showing a configuration of an analysis unit.

FIG. 4 is a block diagram showing a simplified configuration of the analysis unit 4. The analysis unit 4 includes a controller 51, a storage 52, a display part 53, an input part 54, and a communication part 55.

The controller 51 is a circuit for controlling operations of the respective parts of the analysis unit 4 in accordance with functions thereof. The controller 51 includes a CPU and peripheral circuits thereof, for example.

The storage 52 is a circuit that stores various types of a program 60 and various types of data. Similar to the storage 42, the storage 52 includes a hard disk device. The program 60 is stored in the storage 52.

The program 60 includes a control program, an analysis processing program, a calibration curve processing program, and a quality control program. The control program is a program for controlling respective parts (the storage 52, the display part 53, the input part 54, and the communication part 55) of the analysis unit 4 in accordance with functions thereof. The analysis processing program is a program for executing predetermined processes (setting of reagents, setting of a calibration curve, analysis of measurement results, and the like) regarding specimen measurement. The calibration curve processing program is a program for executing predetermined processes (creation and display of a calibration curve, and the like) regarding standard sample measurement. The quality control program is a program for executing predetermined processes (setting of an execution condition, display of measurement results, and the like) regarding quality control sample measurement.

The display part 53 is a touch panel-type display provided with a display device such as a liquid crystal display or an organic EL display.

The input part 54 is a device that inputs, to the specimen analyzer 1, various commands such as a command that instructs creation of a calibration curve, various types of data necessary for operating the specimen analyzer 1, and the like. The input part 54 includes: a pointing device including a keyboard, a mouse, or a touch panel; a plurality of input switches assigned with predetermined functions; and the like.

The communication part 55 is a circuit that performs input/output of data with an external device including the communication part 43 of the measurement unit 2, in accordance with control by the controller 51. The communication part 55 includes an interface circuit using a communication standard such as IEEE1394 and Ethernet (registered trademark), for example.

With reference to FIG. 2A to FIG. 4, a specimen measurement process is described. When specimen measurement for analyzing a specimen is to be performed, the specimen dispenser 18 collects, through suction, a predetermined amount of a specimen by means of the specimen suction nozzle 19, from a specimen container 14 positioned at the specimen suction position 16, and discharges the specimen into a reaction chamber 26 held in a holding hole 24 of the reaction chamber holding part 22. Accordingly, the specimen in the specimen container 14 is dispensed into the reaction chamber 26. When the specimen has been dispensed into the reaction chamber 26, the reaction chamber holding part 22 rotates, whereby the reaction chamber 26 is transferred to the vicinity of the heating part 30. The transfer part 33 of the heating part 30 transfers the reaction chamber 26 from the holding hole 24 of the reaction chamber holding part 22 to a holding hole 32 of the heating part 30. The heating part 30 heats the reaction chamber 26. The reagent dispenser 27-1 collects, through suction, a predetermined amount of a predetermined reagent from the reagent storage part 23 by means of the reagent suction nozzle 28-1. The transfer part 33 transfers the reaction chamber 26 from the heating and holding part 31 to the position 28-1-1 immediately below the reagent suction nozzle 28-1. The reagent dispenser 27-1 moves the reagent suction nozzle 28-1 to the position 28-1-1, and discharges the reagent from the reagent suction nozzle 28-1 into the reaction chamber 26 at the position 28-1-1. Accordingly, the reagent is dispensed into the reaction chamber 26, and the specimen and the reagent are mixed together, whereby a sample is prepared. The transfer part 33 transfers the reaction chamber 26 having the reagent dispensed therein, to a holding hole 32 of the heating part 30. Next, the heating and holding part 31 of the heating part 30 rotates to position the reaction chamber 26 to the vicinity of the sample measurement part 34. The transfer part 37 of the sample measurement part 34 transfers the reaction chamber 26 from the heating and holding part 31 to the position 28-2-1 immediately below a movement path of the reagent suction nozzle 28-2. Next, in order to start coagulation reaction, the reagent dispenser 27-2 moves the reagent suction nozzle 28-2 to the position 28-2-1, and discharges the activation reagent from the reagent suction nozzle 28-2 into the reaction chamber 26 at the position 28-2-1. The transfer part 37 transfers the reaction chamber 26 having the activation reagent dispensed therein, to a sample holding hole 36 of the sample measurement part 34.

The light source part 39A of the sample measurement part 34 applies light to the sample contained in the reaction chamber 26 transferred to the sample holding hole 36. The light receiving part 39B receives light transmitted through the sample, converts an analog electric signal corresponding to the received light intensity into a digital signal, and outputs the digital signal. Light application by the light source part 39A and light reception by the light receiving part 39B are continuously performed for a predetermined time. The digital signals outputted from the light receiving part 39B are stored as time series data into the storage 42. The controller 41 of the measurement unit 2 transmits the time series data stored in the storage 42, to the controller 51 of the analysis unit 4.

Figure 5:
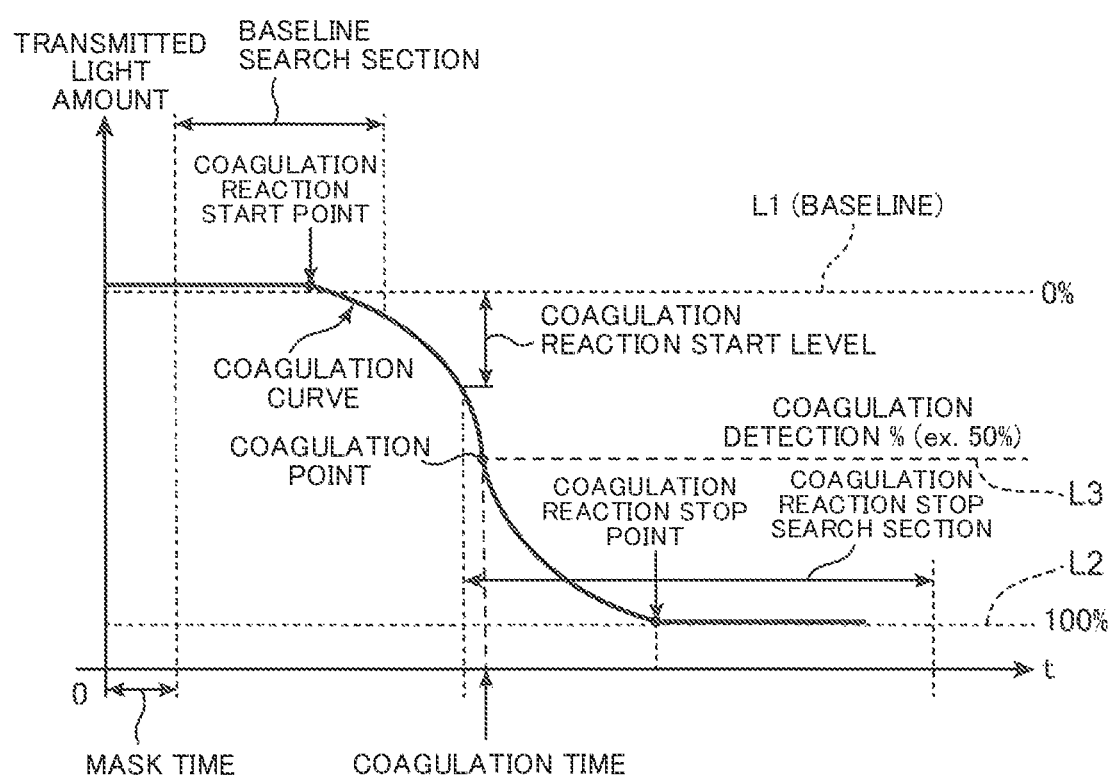
FIG. 5 shows a basic form of a coagulation curve used in calculation of a coagulation time.

The controller 51 of the analysis unit 4 calculates a coagulation time of the specimen on the basis of the received time series data. FIG. 5 shows a basic form of a coagulation curve used in calculation of a coagulation time. The vertical axis of the graph in FIG. 5 represents the magnitude of a digital signal, i.e., the transmitted light amount, outputted from the light receiving part 39B. The horizontal axis of the graph in FIG. 5 represents elapsed time from the start of reception of light by the light receiving part 39B. FIG. 5 shows a percentage detection method as an example of calculation of a coagulation time. The percentage detection method is a method in which a transmitted light amount before progress of coagulation reaction is confirmed, i.e., a baseline L1, is defined as 0%, a transmitted light amount (L2) at the coagulation reaction stop point is defined as 100%, and the time when the transmitted light amount reaches a coagulation detection % is calculated as a coagulation time. The coagulation detection % is set as a value of a predetermined proportion with respect to an interval between the transmitted light amount at the baseline L1 and the transmitted light amount at the coagulation reaction stop point. The coagulation detection % is used in order to search a coagulation point, which is a point to which the transmitted light amount has varied by about a predetermined proportion (coagulation detection %) from the baseline L1. The coagulation detection % is set to a value that is greater than 0 and smaller than 100. The coagulation detection % is set to 50%, for example. The controller 51 calculates the elapsed time when the coagulation detection % has become 50%, as a coagulation time.

Figure 6A:
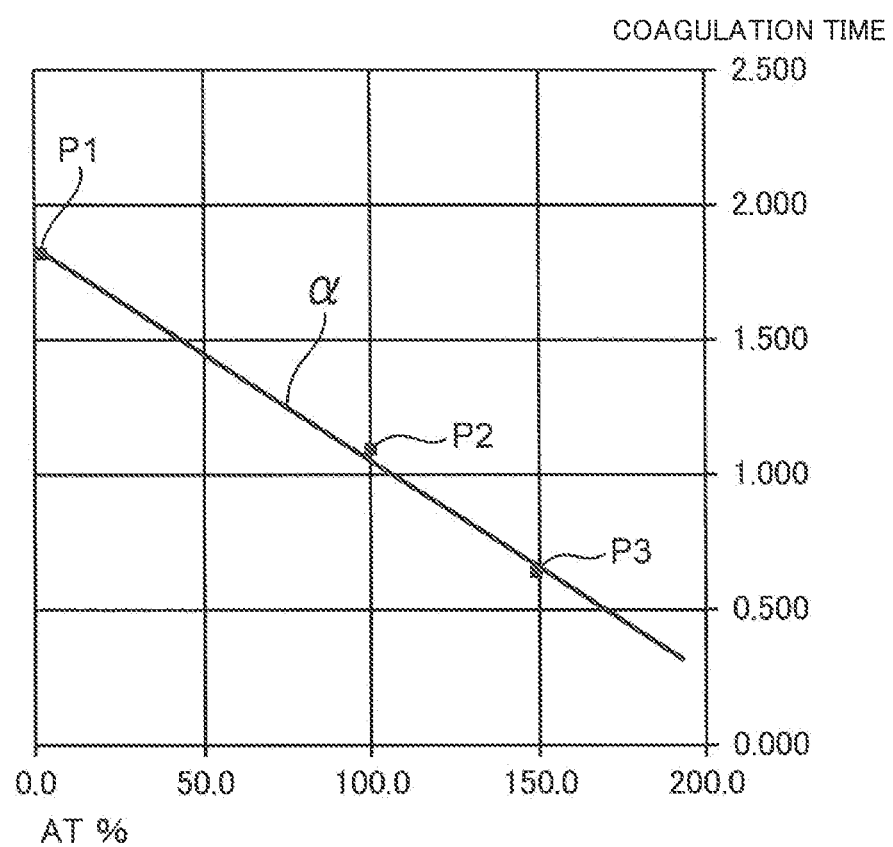
FIG. 6A shows an example a calibration curve.
Figure 6B:
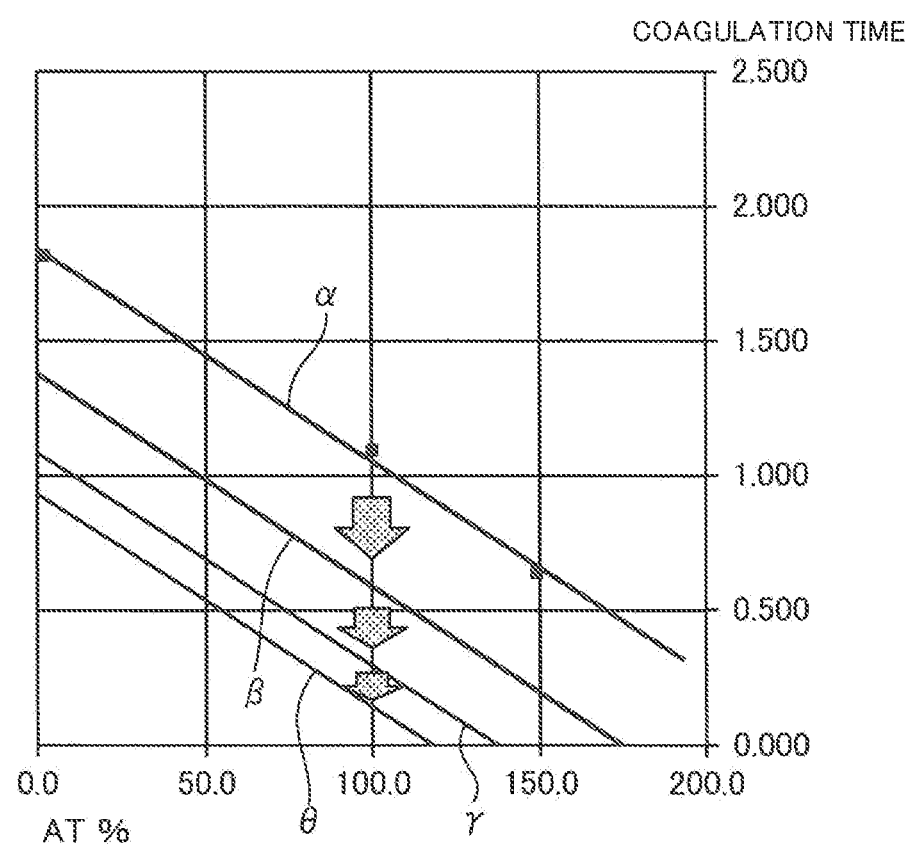
FIG. 6B shows an example of calibration curves.

Next, the controller 51 of the analysis unit 4 applies the calculated coagulation time to a calibration curve, and converts the coagulation time to a concentration of a predetermined component contained in the specimen. The calibration curve is created in advance prior to the measurement of the specimen. FIGS. 6A, 6B each show an example of a calibration curve. In the graphs in FIGS. 6A, 6B, the vertical axis represents coagulation time, the horizontal axis represents concentration of antithrombin (AT), which is an example of the predetermined component, and a line α is a calibration curve. When a specimen has been measured and the coagulation time has been calculated, the concentration on the calibration curve at the coagulation time is determined as the concentration of the predetermined component of the specimen.

For creation of a calibration curve, a standard sample for which the concentration of the predetermined component is known is used. Instead of a specimen container 14, a plurality of containers each containing the same standard sample is set on a specimen rack 15, and the coagulation time of the standard sample is calculated according to a procedure similar to that for the measurement of the specimen described above. However, in order to make the concentrations of the predetermined component different from each other, the specimen dispenser 18 does not mix, for a part of the standard samples, the diluent set in the diluent holding hole 38, and dispenses, for a part of the standard samples, the diluent to reaction chambers 26 to decrease the concentration of the predetermined component. A plurality of points (P1, P2, P3) at each of which a coagulation time obtained by measuring the standard sample and the known concentration (when the standard sample has been diluted, the concentration corresponding to the dilution ratio) of the standard sample cross each other are plotted on the graph of FIGS. 6A, 6B, and an approximate line based on these plots is used as a calibration curve α.

Next, specimen analysis processes performed by the controller 41 of the measurement unit 2 and the controller 51 of the analysis unit 4 are described with reference to FIG. 7A and FIG. 7B. The respective processes shown in FIG. 7A and FIG. 7B are continuously repeated while the specimen analyzer 1 is in operation.

Figure 7A:
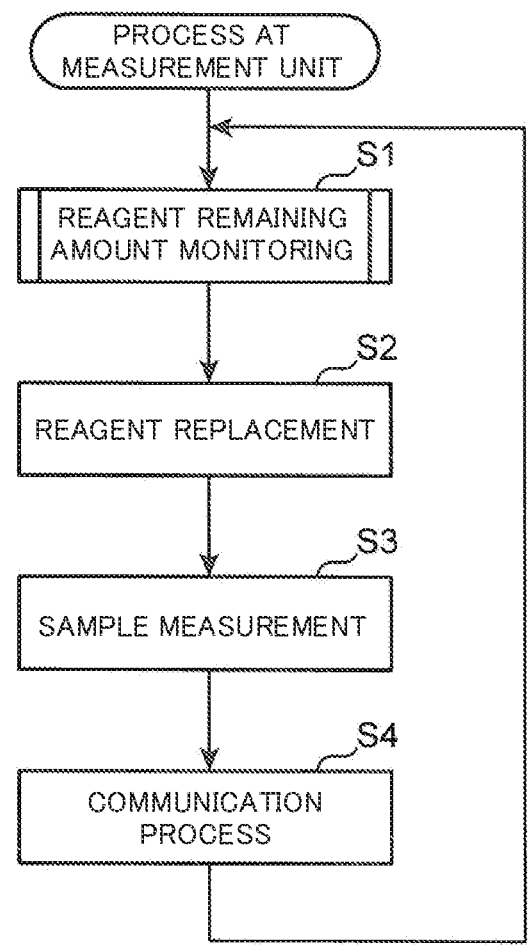
FIG. 7A is a flow chart showing a specimen analysis process performed by a controller of the measurement unit.
Figure 7B:
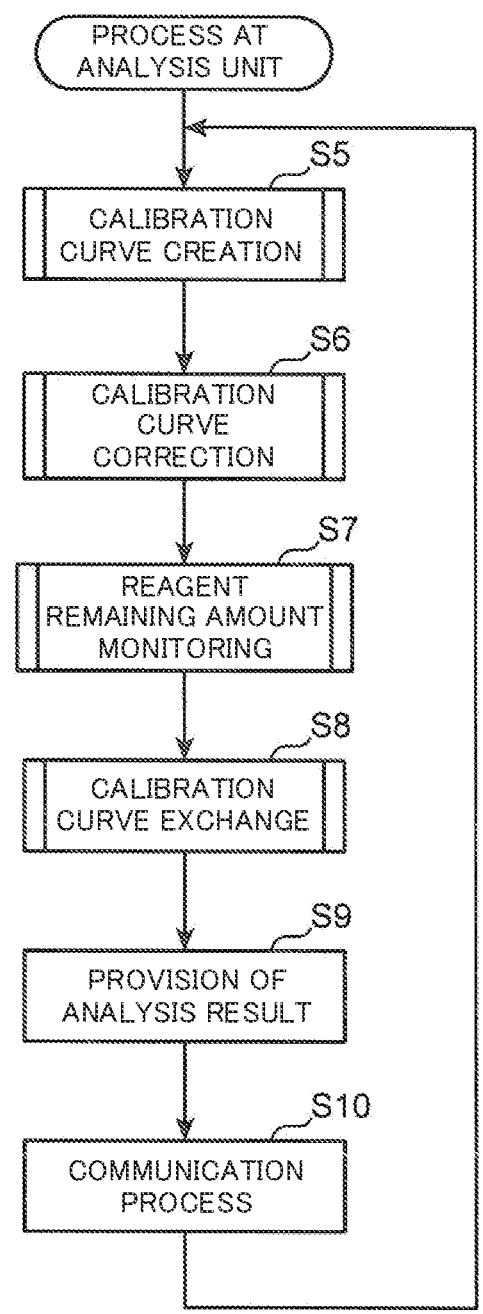
FIG. 7B is a flow chart showing a specimen analysis process performed by a controller of the analysis unit.

As shown in FIG. 7A, in step S1, the controller 41 executes a reagent remaining amount monitoring process for monitoring the remaining amount of the reagent contained in a reagent container. Details of the reagent remaining amount monitoring process will be described later.

In step S2, the controller 41 executes a reagent replacement process. This process is executed when an operator has inputted an instruction of reagent replacement via the display part 53 of the analysis unit 4. In this process, the reagent information reading part 81 reads information indicating the kind of the reagent and information indicating the production lot of the reagent from the reagent information member added to a reagent container newly placed in a reagent holding hole 25 by the operator, and stores the information into the storage 42.

In step S3, the controller 41 executes a sample measurement process. This process is executed when the operator has inputted an instruction of measurement of a sample (specimen of a subject or a standard sample) via the display part 53 of the analysis unit 4. Operation of the measurement unit 2 in the sample measurement process has been described above. In this process, the parts of the measurement unit 2 and the transport unit 3 operate to suction the specimen or the standard sample from a specimen container 14, processes of preparation/heating, etc. of the sample are performed, and digital signals corresponding to the received light amounts are outputted by the detector 39 and stored into the storage 42.

In step S4, the controller 41 executes a communication process. In this process, the information indicating the kind of the reagent and the information indicating the production lot of the reagent that have been stored in step S2, and the information such as the digital signals corresponding to the received light amounts stored in step S3 are transmitted to the communication part 55 of the analysis unit 4.

As shown in FIG. 7B, in step S5, the controller 51 executes a calibration curve creation process. In this process, the controller 51 calculates coagulation times on the basis of the digital signals obtained from the measurement unit 2 through measurement of the standard sample, and creates a calibration curve before being corrected (e.g., calibration curve α) shown in FIG. 6A on the basis of the calculated coagulation times and the known concentrations of the standard sample. Details of the calibration curve creation process will be described later.

In step S6, the controller 51 executes a calibration curve correction process. In this process, the controller 51 corrects the calibration curve before being corrected, and creates a corrected calibration curve (i.e., a calibration curve after the correction. This also applies throughout this specification) (e.g., a calibration curve β, a calibration curve γ, a calibration curve θ) shown in FIG. 6B. Details of the calibration curve correction process will be described later.

In step S7, the controller 51 executes a reagent remaining amount monitoring process of monitoring the remaining amount of the reagent contained in a reagent container. Details of the reagent remaining amount monitoring process will be described later.

In step S8, the controller 51 executes a calibration curve exchange process. The calibration curve exchange process will be described later.

In step S9, the controller 51 executes an analysis result providing process. In this process, the controller 51 calculates a coagulation time on the basis of digital signals corresponding to the received light amounts transmitted from the measurement unit 2, and converts the coagulation time to a concentration by using the calibration curve set to be usable. The converted concentration is displayed on the display part 53. As for the calibration curve used in the concentration conversion, when the calibration curve has not been corrected, the calibration curve before being corrected is used, and when the calibration curve has been corrected, the corrected calibration curve is used.

In step S10, the controller 51 executes a communication process. In this process, the controller 51 receives various types of information such as digital signals and reagent information transmitted from the measurement unit 2, and transmits, to the measurement unit 2, various types of information such as an instruction inputted by the operator.

Figure 8A:
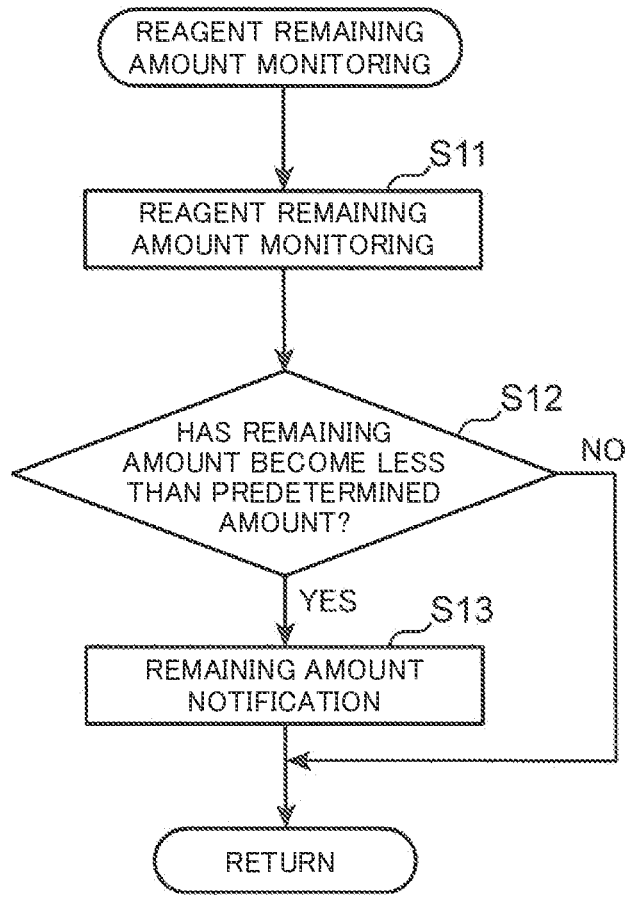
FIG. 8A is a flow chart showing a main process of reagent remaining amount monitoring performed by the controller of the measurement unit.

Next, the reagent remaining amount monitoring process executed by the controller 41 of the measurement unit 2 and the controller 51 of the analysis unit 4 is described with reference to FIG. 8A and FIG. 8B.

In step S11, the controller 41 executes the reagent remaining amount monitoring process. In this process, the controller 41 compares the lowered amount of the suction nozzle at the time when the liquid surface sensor 28A (see FIG. 3) of the reagent dispenser 27 has detected the liquid surface of the reagent, against a threshold for determining that the remaining amount of the reagent has become less than a predetermined amount.

In step S12, the controller 41 determines whether or not the remaining amount of the reagent has become less than the predetermined amount, on the basis of the comparison result in step S11. When the remaining amount of the reagent has become less than the predetermined amount (step S12: YES), the controller 41 notifies, in step S13, the controller 51 of the analysis unit 4 that the remaining amount of the reagent is little. When the remaining amount of the reagent has not become less than the predetermined amount (step S12: NO), the process is returned to the main routine shown in FIG. 7A.

Meanwhile, in step S15, the controller 51 of the analysis unit 4 determines whether or not a notification that the remaining amount of the reagent is little has been received from the controller 41 of the measurement unit 2. When the notification has been received (step S15: YES), the controller 51 displays a reagent remaining amount resetting screen on the display part 53, and resets the reagent remaining amount in accordance with an instruction from the operator, in step S16. When the notification has not been received, the process is returned to the main routine shown in FIG. 7B.

Figure 11:
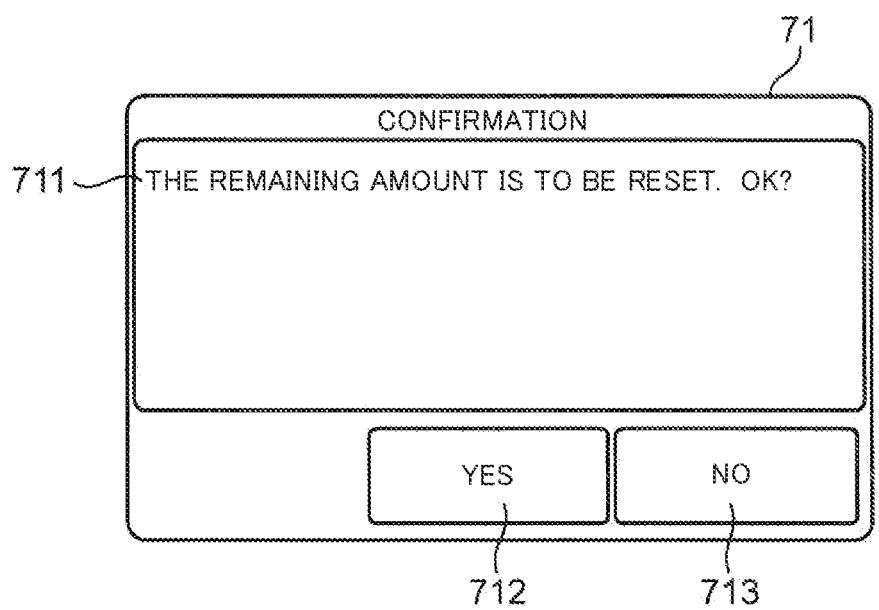
FIG. 11 shows an example of a reagent remaining amount resetting screen.

FIG. 11 shows an example the reagent remaining amount resetting screen displayed in step S16. The reagent remaining amount resetting screen 71 includes: a first message display region 711 for displaying a message of inquiring reset of the remaining amount such as "The remaining amount is to be reset. OK?"; a "YES" button 712; and a "NO" button 713. The "YES" button 712 is a button for inputting an instruction of resetting the remaining amount. The "NO" button 713 is a button for ending the remaining amount reset inquiry screen 71 without resetting the remaining amount.

When the operator has selected the "YES" button 712, the controller 51 resets the reagent remaining amount, i.e., deletes the reagent remaining amount information stored in the storage 52, and displays on the display part 53 an inquiry screen for inquiring whether or not to display a calibration curve screen, in step S16. The operator takes the reagent container in which the remaining amount has become less than the predetermined amount out of the reagent holding hole 25 of the reagent storage part 23, and sets a new reagent container of the same kind into the same reagent holding hole.

Figure 12A:
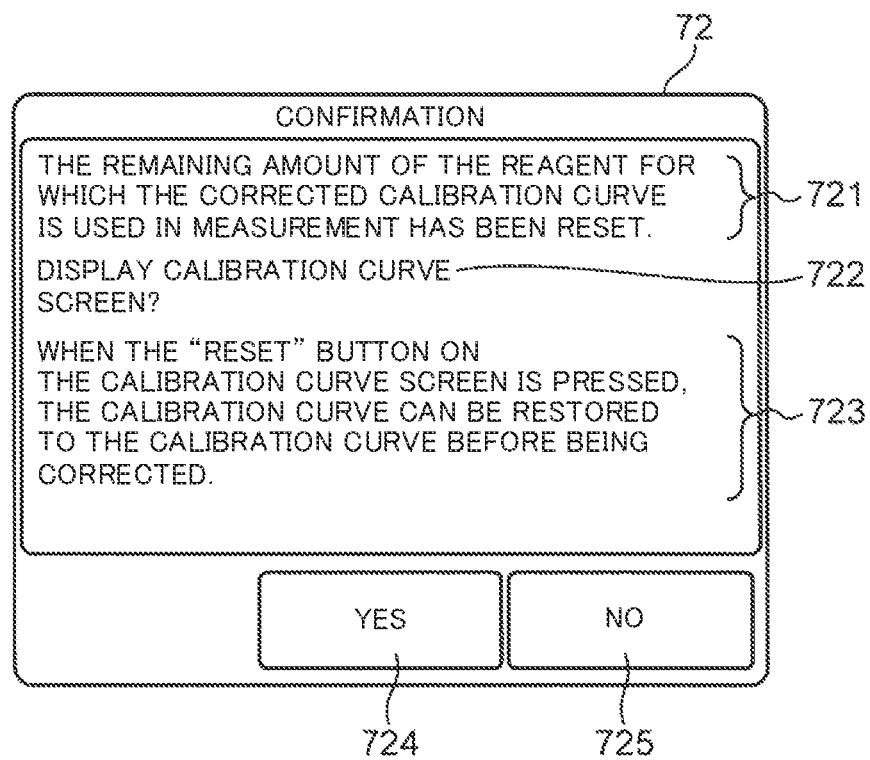
FIG. 12A shows an example of an inquiry screen.

FIG. 12A shows an example of the inquiry screen. The inquiry screen 72 includes: a second message display region 721 for displaying a message of notifying completion of the reset of the remaining amount, such as "The remaining amount of the reagent for which the corrected calibration curve is used in measurement has been reset"; a third message display region 722 for displaying a message of inquiring display of a calibration curve, such as "Display calibration curve screen?"; a fourth message display region 723 for notifying that the corrected calibration curve can be restored to the calibration curve before being corrected, such as "When the 'reset' button on the calibration curve screen is pressed, the calibration curve can be restored to the calibration curve before being corrected"; a "YES" button 724; and a "NO" button 725. The "YES" button 724 is a button for inputting an instruction of displaying a calibration curve. The "NO" button 725 is a button for ending display of the inquiry screen 72.

Figure 12B:
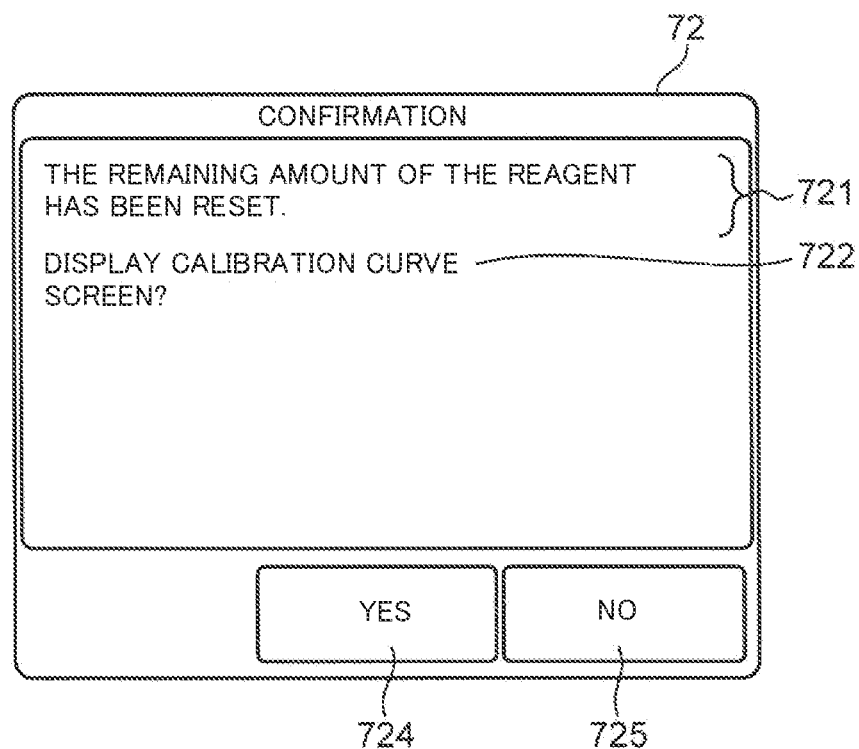
FIG. 12B shows another example of the inquiry screen.

In a case where the calibration curve has not been corrected, the controller 51 displays the inquiry screen in FIG. 12B on the display part 53 in step S16. In this inquiry screen, since the calibration curve has not been corrected, nothing is displayed in the fourth message display region 723.

With reference back to FIG. 8B, the controller 51 sets a calibration curve screen display flag to ON in step S17. The calibration curve is determined, dependent on the state of the reagent. Therefore, when the reagent held in the reagent storage part 23 has been replaced, the calibration curve needs to be re-created. However, when the production lot of the reagent before the replacement and the production lot of the reagent after the replacement are the same, the same calibration curve can be used. Meanwhile, even in a case where the production lot of the reagent before the replacement and the production lot of the reagent after the replacement are the same, if a calibration curve has been created and then the calibration curve has been corrected in accordance with deterioration of the reagent before the replacement, it is necessary to restore the corrected calibration curve to the calibration curve before being corrected.

Figure 9A:
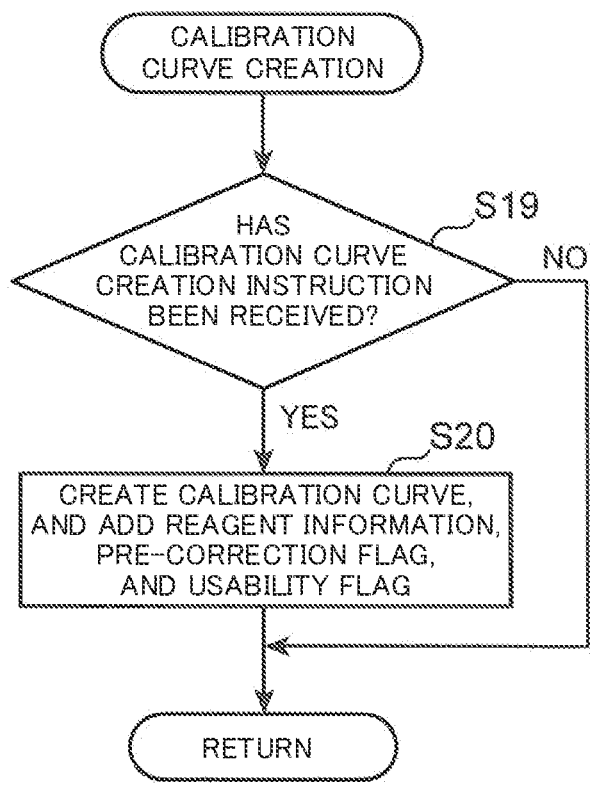
FIG. 9A is a flow chart showing a main process of creation of a calibration curve.
Figure 9B:
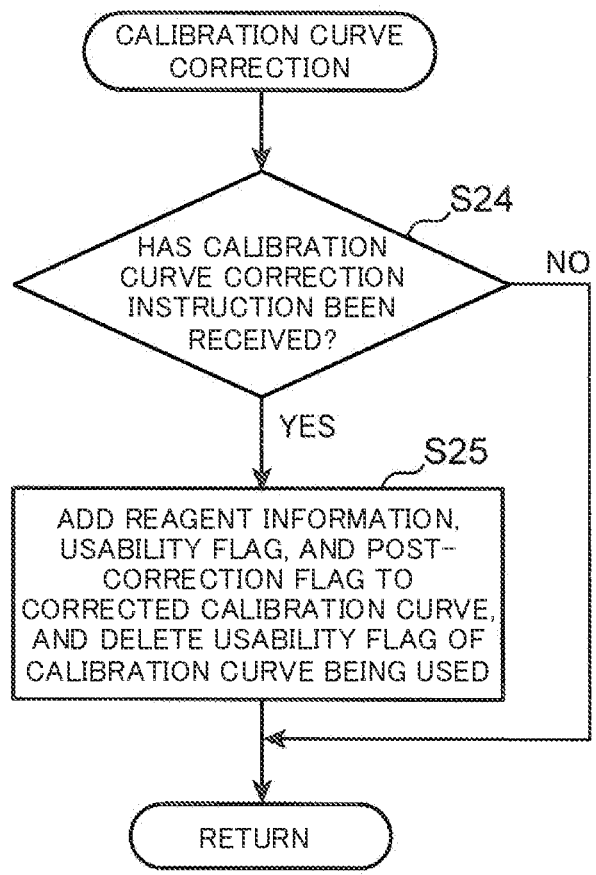
FIG. 9B is a flow chart showing a main process of correction of a calibration curve.

FIG. 9A and FIG. 9B are flow charts respectively showing main processes of creation and correction of a calibration curve. As shown in FIG. 9A, in step S19, the controller 51 of the analysis unit 4 determines whether or not an instruction of creating a calibration curve has been received via the input part 54 from the operator. When the instruction has been received (step S19: YES), the controller 51 creates, in step S20, a calibration curve on the basis of time series digital signals indicating the absorbance of the standard sample and received from the controller 41 of the measurement unit 2. The procedure of creation of the calibration curve has been described above. The controller 51 adds, to the created calibration curve, the kind and production lot information, of the reagent used in measurement of the standard sample, that has been read by the reagent information reading part 81; a pre-correction flag indicating that the calibration curve is the one before being corrected; and a usability flag indicating that the calibration curve can be used in calculation of concentration. Then, the controller 51 stores such information into the storage 52 together with the calibration curve. Accordingly, the calibration curve that has not been corrected is set as a calibration curve usable in calculation of concentration. In step S19, when it has been determined that the instruction of creating a calibration curve has not been received (step S19: NO), the process is returned to the main routine.

As shown in FIG. 9B, in step S24, the controller 51 of the analysis unit 4 determines whether or not an instruction of correcting the calibration curve has been received via the input part 54 from the operator. When the instruction has been received (step S24: YES), the controller 51 corrects, in step S25, the calibration curve to generate a corrected calibration curve and stores the corrected calibration curve into the storage 52. FIG. 6B shows an example of correction of the calibration curve. The example in FIG. 6B displays a calibration curve β after the first correction, which is obtained through parallel translation of a calibration curve α in a direction in which the coagulation time decreases. When the calibration curve β is further corrected, a calibration curve γ after the second correction is displayed. When the calibration curve γ is further corrected, a calibration curve θ after the third correction is displayed.

Further, in step S25, the controller 51 copies the kind and production lot information of the reagent added to the calibration curve before being corrected, and adds the copied information to the corrected calibration curve obtained through correction. In addition, the controller 51 adds, to the corrected calibration curve, a usability flag indicating that this calibration curve can be used in calculation of concentration, and a post-correction flag indicating that this calibration curve is the one obtained through correction. Then, the controller 51 stores the flags into the storage 52 together with the corrected calibration curve. In addition, the controller 51 deletes the usability flag added to the calibration curve before being corrected created in step S20. However, the calibration curve before being corrected, the reagent information, and the pre-correction flag stored in the storage 52 are maintained without being deleted. In step S24, when it has been determined that the instruction of correcting the calibration curve has not been received (step S24: NO), the process is returned to the main routine.

Figure 10:
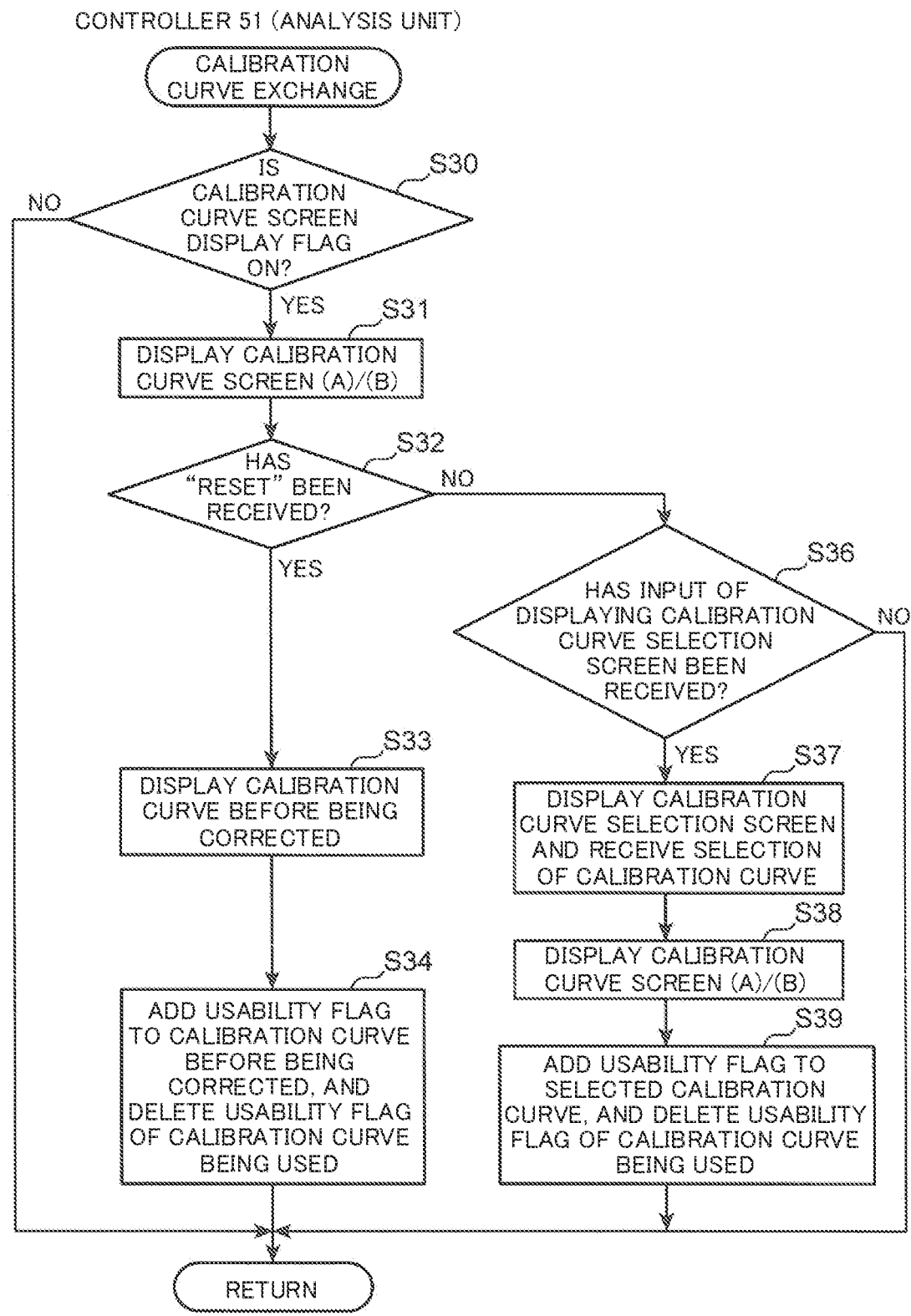
FIG. 10 is a flow chart showing a main process of a calibration curve exchange support process.

FIG. 10 is a flow chart showing the calibration curve exchange process. In step S30, the controller 51 determines whether or not the calibration curve screen display flag is set to ON. When the calibration curve screen display flag has been set to ON (step S30: YES), the controller 51 displays a calibration curve screen in step S31. When the calibration curve screen display flag has not been set to ON (step S30: NO), the controller 51 returns the process to the main routine.

Figure 13A:
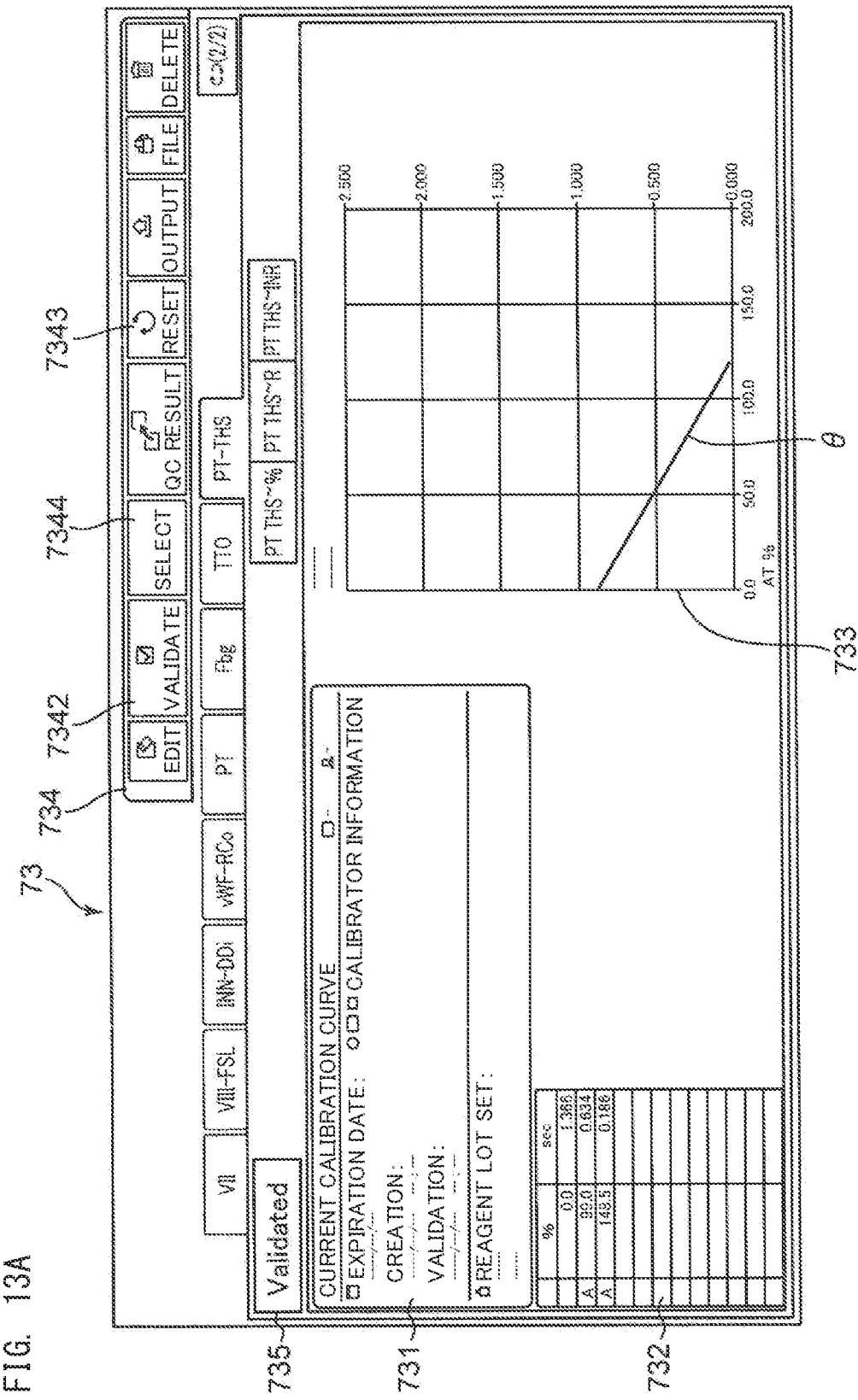
FIG. 13A shows an example of a calibration curve screen.

FIG. 13A shows an example (calibration curve screen (A)) of a calibration curve screen displayed in step S31. A calibration curve screen 73 includes an item information display region 731, a point information display region 732, a graph display region 733, a command region 734, and a calibration curve state display region 735.

The item information display region 731 is a region for displaying calibration curve attribution information regarding the calibration curve having a usability flag added thereto. In the item information display region 731, the expiration date of the calibration curve, the day and time of calibration curve creation, the day and time of validation (the day and time when the usability flag was added), the name and production lot of the standard sample, the production lot of the reagent used in creation of the calibration curve, and the like are displayed as the calibration curve attribution information. The graph display region 733 is a region for displaying the calibration curve. In the example shown in FIG. 13A, the calibration curve θ, which is the calibration curve after three corrections, is displayed. The point information display region 732 is a region for displaying, in numerical values, the correspondence between a given concentration in the calibration curve displayed in the graph display region 733 and the coagulation time corresponding to the concentration.

The command region 734 is a region for displaying command buttons that correspond to commands executable on the calibration curve screen 73. In the command region 734, a plurality of command buttons including a "validate" button 7342, a "reset" button 7343, and a "select" button 7344 are displayed. The "validate" button 7342 is a button for inputting an instruction of setting the calibration curve being displayed, as a usable calibration curve. The "reset" button 7343 is a button for selecting and reading out the calibration curve before being corrected (the calibration curve created in step S20) that is stored in the storage 52, and for displaying the read-out calibration curve in the graph display region 733. The "select" button 7344 is a button for transitioning to a screen for selecting a usable calibration curve from a plurality of calibration curves created in the past and stored in the storage 52. In a case where the calibration curve set to be usable is a corrected calibration curve (i.e., when a post-correction flag has been added), the "reset" button 7343 is set so as to allow reading out of the calibration curve before being corrected that is stored in the storage 52 (the reset button is enabled).

The calibration curve state display region 735 is a region indicating whether or not the calibration curve displayed in the graph display region 733 is set as a usable calibration curve, i.e., whether or not the calibration curve has a usability flag added thereto. When the calibration curve is set as a usable calibration curve, "Validated" is displayed, and when the calibration curve is not set as a usable calibration curve, "Not Validated" is displayed. When no calibration curve is displayed in the graph display region 733, "No Calibration Curve" is displayed. When it is determined that the calibration curve has not been appropriately created, such as when a calibration curve is displayed in the graph display region 733 but, for example, a measurement error has occurred during measurement of the standard sample, "Error" indicating that the calibration curve cannot be set as a usable calibration curve (i.e., that validation is not allowed) is displayed.

Figure 13B:
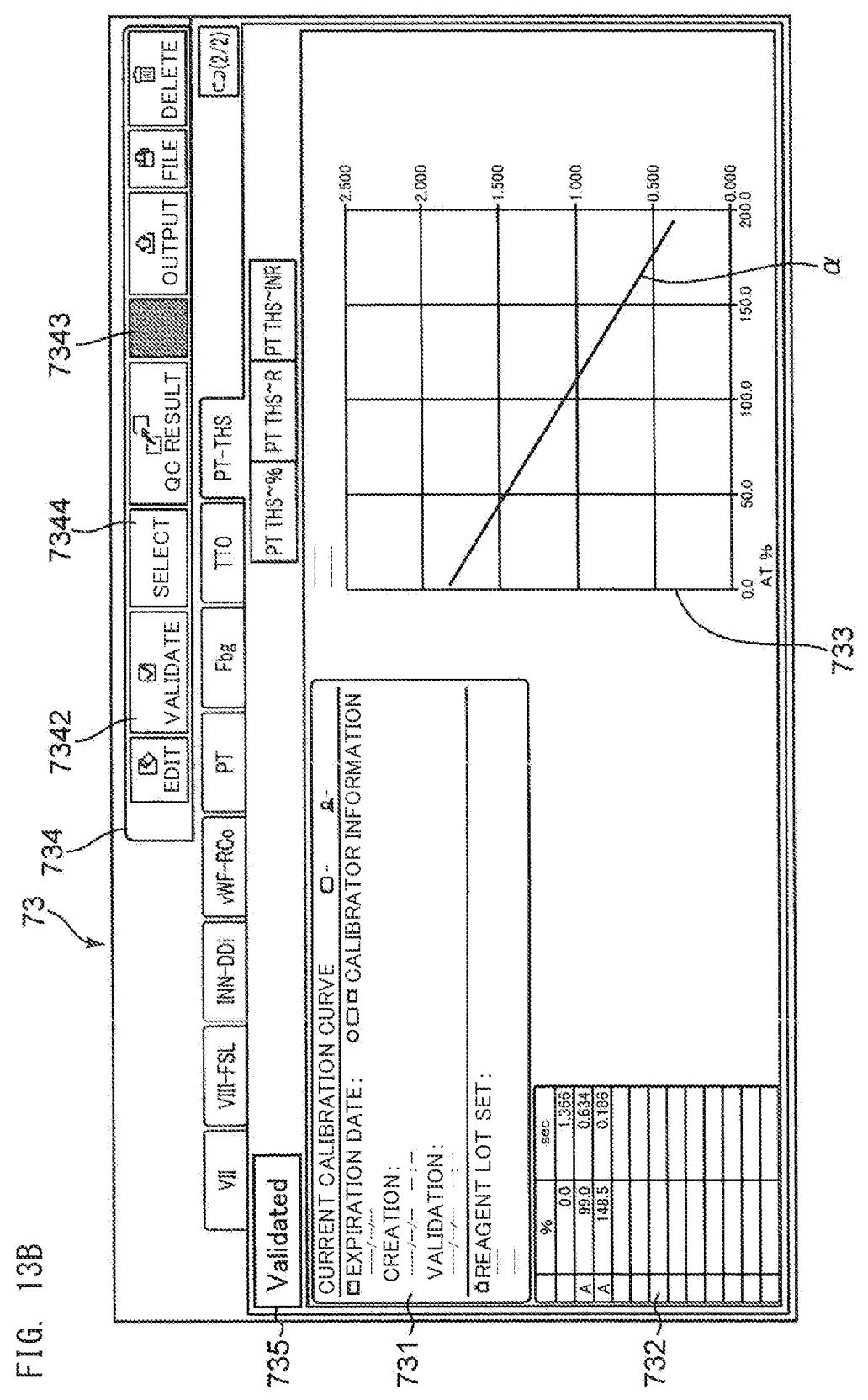

In step S31, when the calibration curve has not been corrected, the calibration curve screen 73 showing the calibration curve that has not been corrected (in the example in FIG. 13B, the calibration curve α) is displayed as shown in FIG. 13B. In this calibration curve screen 73, the "reset" button 7343 is grayed out, and the function of reading out the calibration curve before being corrected is disabled.

With reference back to FIG. 10, the controller 51 determines, in step S32, whether or not an input of the "reset" button 7343 has been received. When the input has been received (step S32: YES), the controller 51 advances the process to step S33, and when the input has not been received (step S32: NO), the controller 51 advances the process to step S36. The operator may confirm the production lot of the reagent before the replacement and the production lot of the reagent after the replacement, and may determine whether or not to select the "reset" button 7343, on the basis of whether or not these production lots are the same.

In step S33, the controller 51 executes a process of displaying the calibration curve before being corrected in the graph display region 733. Since the calibration curve before being corrected has a pre-correction flag added thereto, the controller 51 selects, as the calibration curve before being corrected, a calibration curve to which the pre-correction flag is added, and for which the kind and production lot information of the reagent is the same as that of the corrected calibration curve, read outs the selected calibration curve from the storage 52, and displays the read-out calibration curve on the display part 53.

Figure 14:
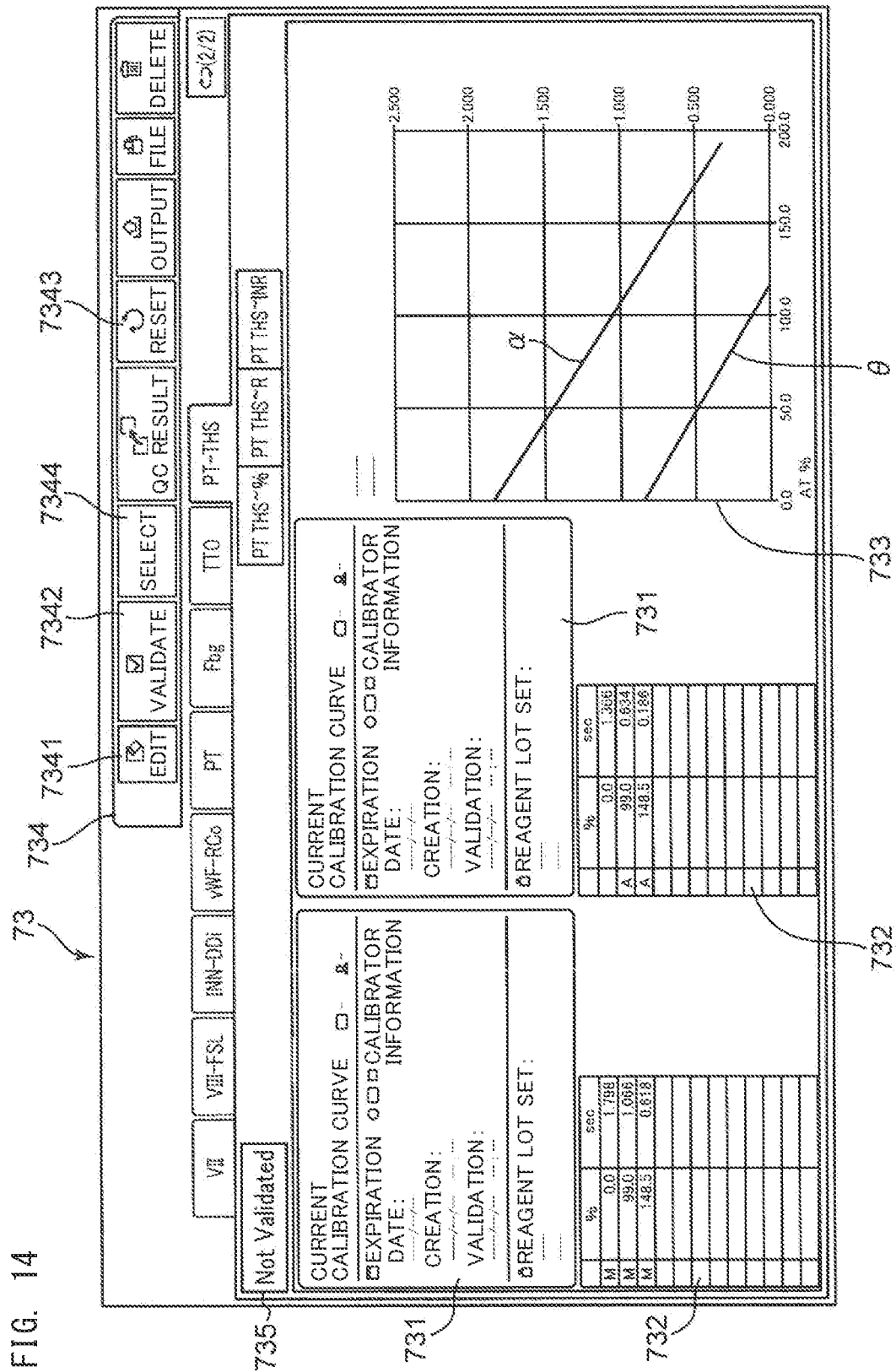
FIG. 14 shows an example of the calibration curve screen on which a calibration curve before being corrected is displayed.

FIG. 14 shows an example of the calibration curve screen on which the calibration curve before being corrected is displayed. As shown in FIG. 14, in the graph display region 733 on the calibration curve screen 73, the calibration curve α before being corrected is displayed in addition to the calibration curve θ after three corrections. In the item information display region 731, the calibration curve attribution information of the calibration curve α is displayed in addition to the information of the calibration curve θ. In the point information display region 732, the coagulation times and concentrations according to the calibration curve α are displayed in numerical values in addition to the information of the calibration curve θ. In the calibration curve state display region 735, "Not Validated" is displayed since the calibration curve a is not set as being usable at this time point (i.e., the usability flag is not added). The operator determines whether the calibration curve α can be set as a usable calibration curve, on the basis of various types of information displayed on the calibration curve screen 73, and when having determined that the calibration curve α can be set as a usable calibration curve, the operator selects the "validate" button 7342.

When the "validate" button 7342 has been selected by the operator, the controller 51 adds, to calibration curve α, a usability flag indicating that this calibration curve is usable in calculation of concentration, and stores the flag in the storage 52 together with the calibration curve α, in step S34. In addition, the controller 51 deletes the usability flag having been added to the calibration curve θ that has been used until that time.

With reference back to FIG. 10, when the controller 51 has determined, in step S32, that the input of the "reset" button 7343 has not been received (step S32: NO), the controller 51 determines, in step S36, whether or not an input of the "select" button 7344 has been received. When having determined that the input of the "select" button 7344 has been received, the controller 51 displays a calibration curve selection screen and receives selection of a calibration curve in step S37.

Figure 15:
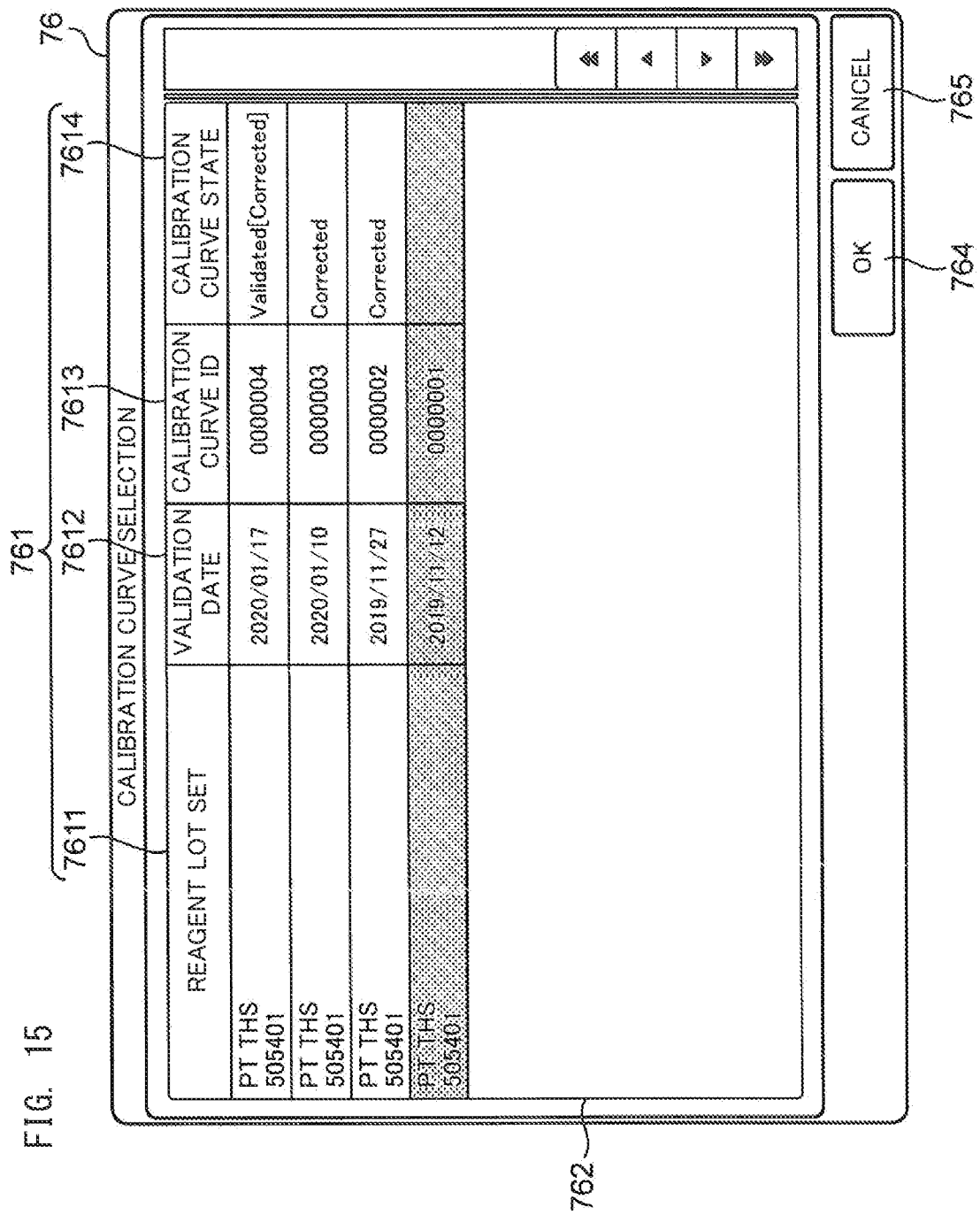
FIG. 15 shows an example of a calibration curve selection screen.

FIG. 15 shows an example of the calibration curve selection screen. On this calibration curve selection screen, a calibration curve having a calibration curve ID 0000001 created for a reagent lot set in which the kind of the reagent is PT and THS and the production lot is 505401, and calibration curves having calibration curve IDs 0000002 to 0000004 created by correcting the calibration curve having a calibration curve ID 0000001, are displayed in the form of a list.

A calibration curve selection screen 76 includes a calibration curve list display region 762 for displaying a calibration curve list 761, an "OK" button 764, and a "cancel" button 765. The calibration curve list 761 includes: a reagent lot set display column 7611 for displaying a reagent set used in creation of the calibration curve; a validation date display column 7612 for displaying the date when the calibration curve was set as a usable calibration curve; a calibration curve ID display column 7613 for displaying a calibration curve ID for identifying the calibration curve; and a calibration curve state display column 7614 for indicating whether the calibration curve is set as a usable calibration curve and whether the calibration curve is the one obtained through correction. In the calibration curve state display column 7614, when the calibration curve is set as a usable calibration curve, "Validated" is displayed. When the calibration curve is the one obtained through correction, "Corrected" is displayed. That is, in the calibration curve state display column 7614, correction history information indicating whether or not correction has been performed for the respective calibration curves having calibration curve IDs 0000001 to 0000004 is displayed.

Each row of the calibration curve list 761 is configured to be selectable through an operation of the input part 54 (in the example in FIG. 15, the calibration curve having the calibration curve ID 0000001 is selected). The "OK" button 764 is a button for inputting an instruction of causing the calibration curve of the selected row to be displayed in the graph display region 733 of the calibration curve screen 73 shown in FIG. 14. The "cancel" button 765 is a button for inputting an instruction of ending the display of the calibration curve selection screen 76 and causing the original calibration curve screen 73 to be displayed.

When the "OK" button 764 has been selected by the operator, the controller 51 ends the display of the calibration curve selection screen 76 and displays, on the display part 53, the calibration curve screen 73 in which the selected calibration curve (in the example in FIG. 14, the calibration curve α) has been added to the graph display region 733, in step S38.

When the "validate" button 7342 on the calibration curve screen 73 has been selected by the operator, the controller 51 adds, to the calibration curve α, a usability flag indicating that this calibration curve is usable in calculation of concentration, and stores the flag into the storage 52 together with the calibration curve α, in step S39. In addition, the controller 51 deletes the usability flag that has been added to the calibration curve that has been used until that time (in the example in FIG. 14, the calibration curve θ).

According to the specimen analyzer 1 and the calibration curve setting method according to the embodiment described above, as a screen for supporting restoration (exchange) of a corrected calibration curve (second calibration curve) to the calibration curve before being corrected (first calibration curve), the calibration curve screen 73 including the "reset" button 7343 and the calibration curve selection screen 76 including correction history information are displayed. Therefore, the operator can restore the calibration curve to the calibration curve before being corrected in a simple manner.

Since the operator can select the "reset" button 7343 in a state where the corrected calibration curve is displayed, the operator can easily understand that the operator is performing operation of restoring the calibration curve to the calibration curve before being corrected.

When the operator has selected the "reset" button 7343, the calibration curve before being corrected and the corrected calibration curve are displayed so as to be arranged next to each other. Therefore, it is easy to understand how much the calibration curve is varied by restoring the calibration curve to the calibration curve before being corrected.

The operator can set the displayed calibration curve before being corrected as a usable calibration curve, simply by selecting the "validate" button 7342. Therefore, the calibration curve can be restored to the calibration curve before being corrected, in a simple manner.

When the remaining amount of the reagent used in measurement of the standard sample has become less than a predetermined amount, the inquiry screen 72 including a message indicating that the calibration curve can be restored to the calibration curve before being corrected is displayed, and the calibration curve screen 73 is displayed. Therefore, the operator can restore the calibration curve to the calibration curve before being corrected, at an appropriate timing.

The "reset" button 7343 is enabled when the calibration curve has been corrected, and is disabled when the calibration curve has not been corrected. Therefore, the operator need not confirm whether or not the calibration curve has been corrected.

According to the specimen analyzer 1 and the calibration curve setting method according to the embodiment described above, the calibration curve list 761 including the history information of correction performed on the calibration curve is displayed. Therefore, the operator can easily understand which calibration curve is a calibration curve that has not been corrected. Since the calibration curve that has not been corrected can be selected from the calibration curve list 761, and the selected calibration curve can be displayed on the calibration curve screen 73, the calibration curve can be restored to the calibration curve before being corrected, in a simple manner.

In order to express the present disclosure, the present disclosure has been appropriately and fully described using an embodiment with reference to the drawings. However, a person skilled in the art should understand that modification and/or improvement of the embodiment described above can be easily realized. Therefore, as long as the modification or the improvement performed by a person skilled in the art does not depart from the scope of rights according to the claims, the modification or the improvement is construed to be included in the scope of rights according to the claims.

For example, in the embodiment described above, as a screen for supporting restoration of the corrected calibration curve (second calibration curve) to the calibration curve before being corrected (first calibration curve), the calibration curve screen 73 including the "reset" button 7343 and the calibration curve selection screen 76 including correction history information are displayed. However, only either one of these screens may be displayed.

For example, in the embodiment described above, in step S25, the controller 51 maintains, without deleting, the calibration curve before being corrected that is stored in the storage 52. However, the content of the correction performed may be stored in the storage 52 and the calibration curve before being corrected may be deleted. In this case, for displaying the calibration curve before being corrected on the calibration curve screen 73, the controller 51 may reproduce the calibration curve before being corrected, on the basis of the corrected calibration curve stored in the storage 52 and the content of the correction stored in the storage 52.

In the embodiment described above, in step S20, a pre-correction flag is added to the calibration curve that has not been corrected, and in step S33, the calibration curve having the pre-correction flag added thereto is selected to be displayed on the calibration curve screen 73. However, without adding the pre-correction flag, the calibration curve having no post-correction flag added thereto may be selected as the calibration curve that has not been corrected, and the selected calibration curve may be displayed on the calibration curve screen 73. Alternatively, without adding the pre-correction flag and the post-correction flag to the calibration curve, a calibration curve that has the oldest day and time when a usability flag was added may be selected as the calibration curve before being corrected.

In the embodiment described above, in step S31, the corrected calibration curve is displayed on the calibration curve screen 73, but the calibration curve before being corrected may be displayed. That is, in the embodiment described above, the calibration curve before being corrected is displayed when the "reset" button 7343 has been selected, but in this modification, the calibration curve before being corrected may be displayed when the "YES" button 724 on the inquiry screen 72 has been selected. That is, in this modification, similar to the "reset" button 7343 in the embodiment described above, the "YES" button 724 on the inquiry screen 72 plays a role of supporting restoration of the corrected calibration curve (second calibration curve) to the calibration curve before being corrected (first calibration curve).

In the embodiment described above, in step S33, the calibration curve before being corrected and the corrected calibration curve are displayed so as to be arranged next to each other on the calibration curve screen 73. However, the corrected calibration curve may be deleted from the screen, and only the calibration curve before being corrected may be displayed.

In the embodiment described above, a usability flag is added to the calibration curve before being corrected, when the "validate" button 7342 has been selected. However, the calibration curve before being corrected may be displayed, and at the same time, a usability flag may be automatically added, when the "reset" button 7343 has been selected.

In the embodiment described above, when the inquiry screen 72 has been displayed and the "YES" button 724 has been selected, the calibration curve screen 73 is displayed. However, the calibration curve screen 73 may be displayed when the "YES" button 712 on the reagent remaining amount resetting screen 71 has been selected.

In the embodiment described above, the blood coagulation analyzer has been described. However, the present disclosure may be applied to another specimen analyzer that uses a calibration curve, such as an immuno analyzer, a biochemical analyzer, or a nucleic acid analyzer. For example, in a case where the present disclosure is applied to an immuno analyzer, a measurement unit sends, to an analysis unit, digital conversion values of light amounts that each correspond to the amount of a predetermined antigen/antibody contained in a standard sample for which the concentration of the antigen/antibody is known, and the analysis unit creates a calibration curve having two axes of the digital conversion value of the light amount and the known concentration of the antigen/antibody.

In the embodiment described above, the measurement processes of the specimen and the standard sample are executed by the controller of the measurement unit, and the processes of creation and correction of a calibration curve are executed by the controller of the analysis unit. However, these processes may be executed by a single controller (a single CPU and the peripheral circuits thereof).

(Another Modification)

Figure 16:
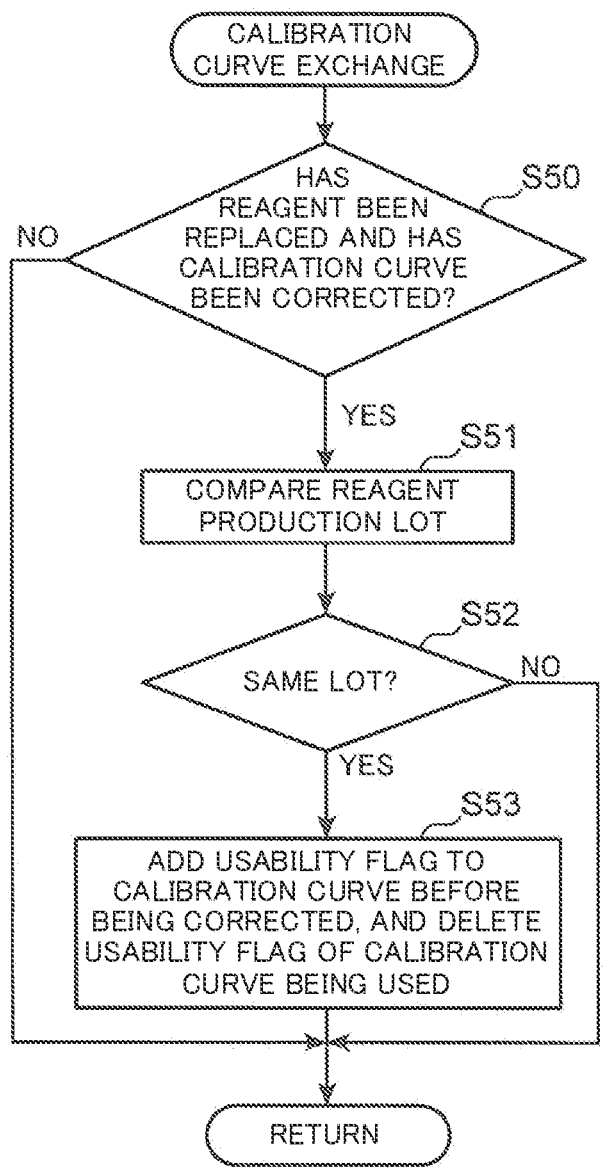
FIG. 16 is a flow chart showing a main process of a calibration curve exchange support process according to a modification.

FIG. 16 shows another modification of the calibration curve exchange support process. The present modification is different from the embodiment described above in that the production lot of the reagent in the reagent container before the replacement and the production lot of the reagent in the reagent container after the replacement are compared by the controller 51.

Figure 8B:
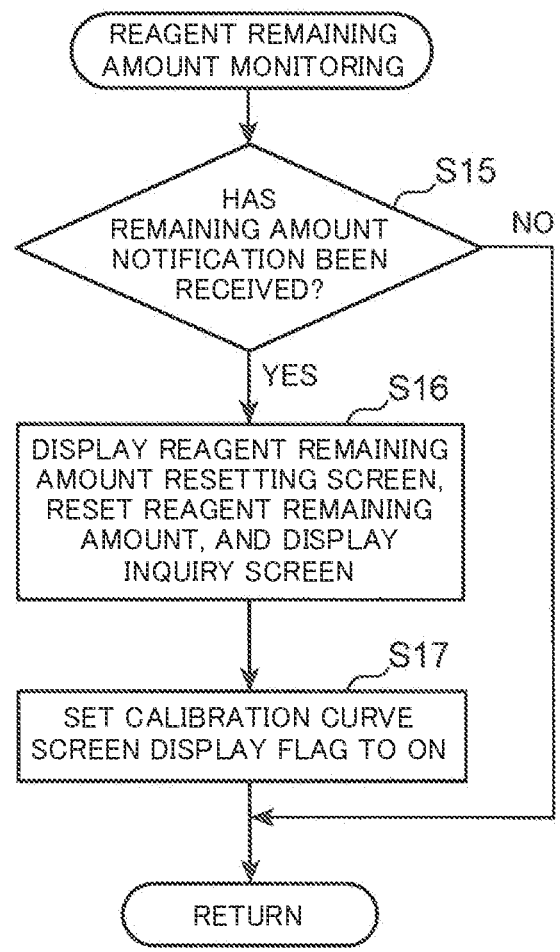
FIG. 8B is a flow chart showing a main process of reagent remaining amount monitoring performed by the controller of the analysis unit.

In step S50, the controller 51 determines whether the reagent has been replaced, i.e., whether step S16 in FIG. 8B has been executed, and whether the calibration curve being used is the one obtained through correction, i.e., whether the calibration curve being used has a post-correction flag added thereto. When the reagent has been replaced, and the calibration curve is the one obtained through correction (step S50: YES), the controller 51 compares the production lot, of the reagent in the reagent container before the replacement, that is stored in the storage 52, and the production lot, of the reagent in the reagent container after the replacement, that has been read by the reagent information reading part 81. When the reagent has not been replaced, or when the calibration curve is not the one obtained through correction (step S50: NO), the process is returned to the main routine.

When the compared production lots are the same with each other (step S52: YES), the controller 51 adds a usability flag to the calibration curve before being corrected, and deletes the usability flag added to the corrected calibration curve being used, in step S53. When the compared production lots are not the same with each other (step S52: NO), the process is returned to the main routine.

In the present modification, in a case where the calibration curve has been corrected before the reagent is replaced, the analysis result is provided in step S9 shown in FIG. 7B, using the corrected calibration curve until the reagent is replaced. After the reagent is replaced, when the production lot of the reagent in the reagent container before the replacement and the production lot of the reagent in the reagent container after the replacement are the same with each other, the corrected calibration curve is automatically restored to the calibration curve before being corrected, and the analysis result using the calibration curve before being corrected is provided in step S9. In this manner, in the present modification, when the production lot of the reagent in the reagent container before the replacement and the production lot of the reagent in the reagent container after the replacement are the same with each other, the corrected calibration curve is automatically restored to the calibration curve before being corrected. Therefore, the operator need not confirm the production lot of the reagent, and the operation of restoring the corrected calibration curve to the calibration curve before being corrected is simplified.

In the present modification, when the compared production lots are the same with each other (step S52: YES), the calibration curve screen 73 shown in FIG. 13 or FIG. 14 may be displayed, and display of the calibration curve before being corrected, based on the "reset" button 7343, and/or approval of the calibration curve before being corrected, based on the "validate" button 7342, may be executed.

What is claimed is:

1. A calibration curve setting method for setting a calibration curve, the calibration curve setting method comprising:
   creating a first calibration curve on the basis of a measurement value obtained by measuring a standard sample for which a concentration of a predetermined component is known;
   creating a second calibration curve by correcting the created first calibration curve;
   displaying a screen configured to support an operator for restoring the second calibration curve to the first calibration curve;
   receiving an instruction of restoring the second calibration curve to the first calibration curve; and
   displaying the first calibration curve upon receiving the instruction of restoring by:
      selecting and displaying the first calibration curve on the basis of a correction flag upon receiving, through an instruction reception button, the instruction of restoring.

2. The calibration curve setting method of claim 1, wherein
   the screen includes an instruction reception button configured to receive from the operator the instruction of restoring the second calibration curve to the first calibration curve, and
   the receiving the instruction of restoring comprises
   receiving, through the instruction reception button, the instruction of restoring.

3. The calibration curve setting method of claim 2, wherein
   the receiving, through the instruction reception button, the instruction of restoring comprises receiving the instruction of restoring, in a state where the second calibration curve is displayed.

4. The calibration curve setting method of claim 2, further comprising:
   notifying the operator that reception of the instruction of restoring is possible, when a remaining amount of a reagent used in the measurement of the standard sample becomes less than a predetermined amount, and wherein
   the screen including the instruction reception button is displayed.

5. The calibration curve setting method of claim 2, wherein
   the instruction reception button is enabled when the second calibration curve has been created, and the instruction reception button is disabled when the second calibration curve has not been created.

6. The calibration curve setting method of claim 2, wherein
   the displaying of the first calibration curve comprises displaying the first calibration curve and second calibration curve so as to be arranged next to each other.

7. The calibration curve setting method of claim 2, further comprising
   receiving an instruction for setting the displayed first calibration curve as a usable calibration curve.

8. The calibration curve setting method of claim 1, wherein
   the screen includes history information of correction performed on the first calibration curve.

9. The calibration curve setting method of claim 8, wherein
   the history information of correction includes information indicating whether or not correction of a calibration curve has been performed.

10. The calibration curve setting method of claim 8, wherein
the screen further includes a calibration curve list indicating a plurality of calibration curves created in the past.

11. The calibration curve setting method of claim 10 further comprising:
receiving a selection of the first calibration curve from among the plurality of calibration curves displayed on the calibration curve list;
displaying the selected first calibration curve; and
setting, as a usable calibration curve, the first calibration curve displayed in accordance with the received selection.

12. A calibration curve setting method for setting a calibration curve, the calibration curve setting method comprising
creating a first calibration curve on the basis of a measurement value obtained by measuring a standard sample for which a concentration of a predetermined component is known;
creating a second calibration curve by correcting the created first calibration curve;
displaying a screen configured to support an operator for restoring the second calibration curve to the first calibration curve;
receiving an instruction of restoring the second calibration curve to the first calibration curve;
adding a correction flag indicating whether or not correction has been performed, to the first calibration curve and/or the first calibration curve that has been corrected; and
displaying the first calibration curve upon receiving the instruction of restoring by:
selecting and displaying the first calibration curve on the basis of the correction flag upon receiving, through an instruction reception button, the instruction of restoring.

13. A non-transitory calibration curve setting program configured to set a calibration curve, the calibration curve setting program causing a computer to execute:
creating a first calibration curve on the basis of a measurement value obtained by measuring a standard sample for which a concentration of a predetermined component is known;
creating a second calibration curve by correcting the created first calibration curve; displaying a screen configured to support an operator for restoring the second calibration curve to the first calibration curve;
receiving an instruction of restoring the second calibration curve to the first calibration curve; and
displaying the first calibration curve upon receiving the instruction of restoring by:
selecting and displaying the first calibration curve on the basis of a correction flag upon receiving, through an instruction reception button, the instruction of restoring.

\* \* \* \* \*